US012296791B2

(12) United States Patent
Rodriguez

(10) Patent No.: US 12,296,791 B2
(45) Date of Patent: May 13, 2025

(54) ALL-TERRAIN VEHICLE

(71) Applicant: Polaris Industries Inc., Medina, MN (US)

(72) Inventor: William B. Rodriguez, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/211,959

(22) Filed: Jun. 20, 2023

(65) Prior Publication Data

US 2023/0331170 A1 Oct. 19, 2023

Related U.S. Application Data

(62) Division of application No. 16/723,182, filed on Dec. 20, 2019, now Pat. No. 11,718,240.

(51) Int. Cl.
*B60R 9/06* (2006.01)
*B60K 1/04* (2019.01)

(52) U.S. Cl.
CPC .............. *B60R 9/06* (2013.01); *B60K 1/04* (2013.01); *B60K 2001/0411* (2013.01); *B60Y 2200/124* (2013.01)

(58) Field of Classification Search
CPC ..... B60R 9/06; B60K 1/04; B60K 2001/0411; B60Y 2200/124
USPC ....................................................... 180/233
See application file for complete search history.

(56) References Cited

U.S. PATENT DOCUMENTS

| | | |
|---|---|---|
| 1,082,423 A | 12/1913 | Hartman |
| 1,951,220 A | 3/1934 | Tarr |
| 2,141,093 A | 12/1938 | Edward et al. |
| 2,284,352 A | 5/1942 | Zank |
| 2,396,511 A | 3/1946 | Issigonis |
| 2,628,657 A | 2/1953 | Orrick, Jr. |
| 2,672,103 A | 3/1954 | Hohmes |
| 2,868,273 A | 1/1959 | Barrett |
| 2,984,290 A | 5/1961 | Miller |
| 3,167,298 A | 1/1965 | Alexander et al. |
| 3,347,512 A | 10/1967 | Campbell |

(Continued)

FOREIGN PATENT DOCUMENTS

| | | |
|---|---|---|
| CA | 3004855 A1 | 11/2019 |
| CH | 317335 A | 11/1956 |

(Continued)

OTHER PUBLICATIONS

"2019 Polaris Sportsman 850" Polaris., posted date Jul. 23, 2019 [online], [retrieved on Jul. 13, 2021], Retrieved from the Internet <URL: http://atvillustrated.com/content/2019-polaris-sportsman-850-sp-premium-review> (Year: 2019).

(Continued)

*Primary Examiner* — Hau V Phan
(74) *Attorney, Agent, or Firm* — Faegre Drinker Biddle & Reath LLP

(57) ABSTRACT

An all-terrain vehicle includes a frame, a plurality of ground-engaging members for supporting the frame, an outer body supported by the frame, and a cargo rack pivotably coupled to the outer body. The cargo rack is moveably between a closed position and an opened position and includes a hinge assembly comprising hinge leaves and a removable hinge pin.

20 Claims, 20 Drawing Sheets

(56) References Cited

U.S. PATENT DOCUMENTS

| | | |
|---|---|---|
| 3,508,764 A | 4/1970 | Dobson et al. |
| 3,560,022 A | 2/1971 | Gold |
| 3,736,020 A | 5/1973 | Pilachowski et al. |
| 3,747,888 A | 7/1973 | Heckett |
| 3,841,696 A | 10/1974 | Wagner |
| 3,844,610 A | 10/1974 | Adams |
| 3,858,902 A | 1/1975 | Howells et al. |
| 3,913,975 A | 10/1975 | Carter |
| 3,927,854 A | 12/1975 | Carey |
| 4,027,892 A | 6/1977 | Parks |
| 4,059,171 A | 11/1977 | Pakosh |
| 4,062,585 A | 12/1977 | Herring, Jr. |
| 4,098,414 A | 7/1978 | Abiera |
| 4,129,198 A | 12/1978 | Hunter |
| 4,198,092 A | 4/1980 | Federspiel |
| 4,380,352 A | 4/1983 | Diffrient |
| 4,521,053 A | 6/1985 | De Boer |
| 4,522,454 A | 6/1985 | Hochstatter |
| 4,527,831 A | 7/1985 | Katsuoka |
| 4,561,323 A | 12/1985 | Stromberg |
| 4,563,038 A | 1/1986 | Hirose |
| 4,662,597 A | 5/1987 | Uecker et al. |
| 4,714,227 A | 12/1987 | Holm et al. |
| 4,779,695 A | 10/1988 | Yasui |
| 4,821,825 A | 4/1989 | Somerton-Rayner |
| 4,844,309 A | 7/1989 | Aubin et al. |
| 4,934,737 A | 6/1990 | Nakatsuka |
| 4,941,784 A | 7/1990 | Flament |
| 5,007,675 A | 4/1991 | Musto et al. |
| 5,036,939 A | 8/1991 | Johnson et al. |
| 5,037,155 A | 8/1991 | Holm et al. |
| 5,083,632 A | 1/1992 | Saito et al. |
| 5,149,034 A | 9/1992 | Ganaja |
| 5,251,713 A | 10/1993 | Enokimoto |
| 5,309,861 A | 5/1994 | Mardikian |
| 5,324,095 A | 6/1994 | Yamauchi |
| 5,367,978 A | 11/1994 | Mardikian |
| 5,458,213 A | 10/1995 | Nakaya et al. |
| 5,509,496 A | 4/1996 | Erickson et al. |
| 5,549,428 A | 8/1996 | Yeatts |
| 5,613,570 A | 3/1997 | Becker |
| 5,618,021 A | 4/1997 | Brodersen |
| 5,676,292 A | 10/1997 | Miller |
| 5,713,629 A | 2/1998 | Plackis |
| 5,776,568 A | 7/1998 | Andress et al. |
| 5,863,277 A | 1/1999 | Melbourne |
| 5,876,085 A | 3/1999 | Hill |
| 5,950,750 A | 9/1999 | Dong et al. |
| 6,007,150 A | 12/1999 | Clerkin et al. |
| 6,092,877 A | 7/2000 | Rasidescu et al. |
| 6,102,466 A | 8/2000 | Kanazawa et al. |
| 6,149,540 A | 11/2000 | Johnson et al. |
| 6,182,590 B1 | 2/2001 | Patera |
| 6,196,634 B1 | 3/2001 | Jurinek |
| 6,199,894 B1 | 3/2001 | Anderson |
| 6,276,653 B1 | 8/2001 | Traxler |
| 6,354,556 B1 | 3/2002 | Ritchie et al. |
| 6,460,818 B1 | 10/2002 | Garelick et al. |
| 6,467,787 B1 | 10/2002 | Marsh |
| 6,530,730 B2 | 3/2003 | Swensen |
| 6,565,241 B1 | 5/2003 | Glynn |
| 6,622,968 B1 | 9/2003 | St et al. |
| 6,648,569 B2 | 11/2003 | Douglass et al. |
| 6,695,566 B2 | 2/2004 | Rodriguez Navio |
| 6,725,962 B1 | 4/2004 | Fukuda |
| 6,732,830 B2 | 5/2004 | Gagnon et al. |
| 6,752,235 B1 | 6/2004 | Bell et al. |
| 6,767,040 B1 | 7/2004 | Freijy |
| 6,773,049 B2 | 8/2004 | Rupiper et al. |
| 6,776,250 B2 | 8/2004 | Kuji et al. |
| 6,786,526 B1 | 9/2004 | Blalock |
| 6,799,779 B2 | 10/2004 | Shibayama |
| 6,799,781 B2 | 10/2004 | Rasidescu et al. |
| 6,880,483 B2 | 4/2005 | Fedders |
| 6,916,142 B2 | 7/2005 | Hansen et al. |
| 6,923,507 B1 | 8/2005 | Billberg et al. |
| RE38,895 E | 11/2005 | McLemore |
| 6,968,917 B2 | 11/2005 | Rondeau et al. |
| 6,971,714 B1 | 12/2005 | Hanagan |
| 6,976,720 B1 | 12/2005 | Bequette |
| 6,978,857 B2 | 12/2005 | Korenjak |
| 7,008,015 B2 | 3/2006 | Bischoff |
| 7,055,454 B1 | 6/2006 | Whiting et al. |
| 7,121,371 B2 | 10/2006 | Rondeau et al. |
| 7,124,853 B1 | 10/2006 | Kole, Jr. |
| 7,125,134 B1 | 10/2006 | Hedlund et al. |
| 7,128,341 B1 | 10/2006 | Dahl et al. |
| 7,137,764 B2 | 11/2006 | Johnson |
| 7,237,789 B1 | 7/2007 | Herman |
| 7,239,032 B1 * | 7/2007 | Wilson .................. F02N 11/04 |
| | | 290/31 |
| 7,258,192 B2 | 8/2007 | Davis et al. |
| 7,266,431 B2 | 9/2007 | Jackson |
| 7,331,418 B2 | 2/2008 | Audet |
| 7,377,223 B2 | 5/2008 | Toupin et al. |
| 7,416,234 B2 | 8/2008 | Bequette |
| 7,431,024 B2 | 10/2008 | Buchwitz et al. |
| 7,506,714 B2 | 3/2009 | Davis et al. |
| D593,003 S | 5/2009 | Sanschagrin et al. |
| D593,454 S | 6/2009 | Sanschagrin et al. |
| D594,388 S | 6/2009 | Sanschagrin et al. |
| D606,900 S | 12/2009 | Flores |
| 7,682,115 B1 | 3/2010 | Jay et al. |
| 7,686,368 B2 | 3/2010 | Ghergheli et al. |
| 7,703,826 B1 | 4/2010 | German |
| D625,662 S | 10/2010 | Li |
| 8,122,993 B2 | 2/2012 | Ripley et al. |
| D657,720 S | 4/2012 | Eck et al. |
| 8,156,841 B2 * | 4/2012 | Yasuda .................. F16H 61/36 |
| | | 74/473.23 |
| 8,205,910 B2 | 6/2012 | Leonard et al. |
| 8,215,694 B2 | 7/2012 | Smith et al. |
| D665,309 S | 8/2012 | Lepine et al. |
| D665,312 S | 8/2012 | Lepine et al. |
| 8,245,657 B2 | 8/2012 | Ross et al. |
| D670,198 S | 11/2012 | Li et al. |
| 8,376,441 B2 | 2/2013 | Nakamura et al. |
| D679,627 S | 4/2013 | Li et al. |
| 8,430,442 B2 | 4/2013 | Utke et al. |
| D682,737 S | 5/2013 | Li et al. |
| D682,738 S | 5/2013 | Li et al. |
| 8,555,799 B2 | 10/2013 | Otsuka et al. |
| D694,668 S | 12/2013 | Li et al. |
| 8,596,398 B2 | 12/2013 | Bennett |
| D699,627 S | 2/2014 | Tang |
| D701,143 S | 3/2014 | Shan |
| 8,678,464 B2 | 3/2014 | Smith et al. |
| 8,678,976 B1 * | 3/2014 | Wilson ................ B60W 50/082 |
| | | 477/35 |
| 8,720,355 B2 | 5/2014 | Aoyama |
| 8,905,435 B2 | 12/2014 | Ripley et al. |
| D722,927 S | 2/2015 | Schroeder et al. |
| D727,807 S | 4/2015 | Schroeder et al. |
| 9,080,514 B2 | 7/2015 | Utke et al. |
| D756,845 S | 5/2016 | Flores |
| 9,649,928 B2 | 5/2017 | Danielson et al. |
| D805,009 S | 12/2017 | Eck et al. |
| 9,873,316 B2 | 1/2018 | Lovold et al. |
| 9,944,177 B2 | 4/2018 | Fischer et al. |
| 10,023,047 B2 * | 7/2018 | Tanaka ................ B60K 15/0406 |
| 10,336,409 B1 | 7/2019 | Girard et al. |
| D862,286 S | 10/2019 | Flores |
| D866,402 S | 11/2019 | Wang et al. |
| 10,569,819 B2 | 2/2020 | Lovold et al. |
| D886,678 S | 6/2020 | Lai et al. |
| D906,181 S | 12/2020 | Lou et al. |
| D908,536 S | 1/2021 | Ye et al. |
| D913,847 S | 3/2021 | Hashimoto et al. |
| D935,945 S | 11/2021 | Bruderer et al. |
| D950,419 S | 5/2022 | Lou et al. |
| D950,420 S | 5/2022 | Lou et al. |
| D958,006 S | 7/2022 | Dunn et al. |
| D962,823 S | 9/2022 | Dunn et al. |
| 11,718,240 B2 | 8/2023 | Kelso et al. |

(56) References Cited

U.S. PATENT DOCUMENTS

| | | |
|---|---|---|
| 2002/0011745 A1 | 1/2002 | Petersen |
| 2002/0047257 A1 | 4/2002 | Rondeau et al. |
| 2002/0147072 A1 | 10/2002 | Goodell et al. |
| 2002/0178968 A1 | 12/2002 | Christensen |
| 2003/0001409 A1 | 1/2003 | Semple et al. |
| 2004/0026150 A1 | 2/2004 | Nishi et al. |
| 2004/0029459 A1 | 2/2004 | Berthiaume et al. |
| 2004/0031640 A1 | 2/2004 | Tweet |
| 2004/0079561 A1 | 4/2004 | Ozawa et al. |
| 2004/0080186 A1 | 4/2004 | Crepeau et al. |
| 2004/0108159 A1 | 6/2004 | Rondeau et al. |
| 2004/0173653 A1 | 9/2004 | Audet |
| 2004/0195797 A1 | 10/2004 | Nash et al. |
| 2004/0239088 A1 | 12/2004 | Rondeau et al. |
| 2005/0121953 A1 | 6/2005 | Sprouse |
| 2005/0168018 A1 | 8/2005 | Cox |
| 2005/0173177 A1 | 8/2005 | Smith et al. |
| 2005/0173180 A1 | 8/2005 | Hypes et al. |
| 2005/0247506 A1 | 11/2005 | Rondeau et al. |
| 2005/0248116 A1 | 11/2005 | Fanson |
| 2005/0275268 A1 | 12/2005 | Hiroyasu |
| 2006/0066122 A1 | 3/2006 | Wiseman |
| 2006/0097692 A1 | 5/2006 | Chen et al. |
| 2006/0113139 A1 | 6/2006 | Nishi et al. |
| 2006/0186699 A1 | 8/2006 | Davis et al. |
| 2007/0034435 A1 | 2/2007 | Berg et al. |
| 2007/0262604 A1 | 11/2007 | Takei et al. |
| 2007/0278026 A1 | 12/2007 | Davis et al. |
| 2008/0023240 A1 | 1/2008 | Sunsdahl et al. |
| 2008/0023249 A1 | 1/2008 | Sunsdahl et al. |
| 2008/0068849 A1 | 3/2008 | Ostroski et al. |
| 2008/0217088 A1 | 9/2008 | Berg |
| 2009/0195035 A1 | 8/2009 | Ripley et al. |
| 2009/0236820 A1 | 9/2009 | Chang et al. |
| 2010/0019524 A1* | 1/2010 | Utke ............... B60N 2/502 296/65.05 |
| 2010/0084212 A1 | 4/2010 | Smith et al. |
| 2011/0094813 A1 | 4/2011 | Suzuki et al. |
| 2011/0094816 A1 | 4/2011 | Suzuki et al. |
| 2012/0031694 A1 | 2/2012 | Deckard et al. |
| 2014/0102820 A1 | 4/2014 | Deckard et al. |
| 2014/0262584 A1 | 9/2014 | Lovold et al. |
| 2015/0047917 A1 | 2/2015 | Burt et al. |
| 2016/0332536 A1 | 11/2016 | Weber et al. |
| 2017/0066362 A1 | 3/2017 | Grider et al. |
| 2017/0190373 A1 | 7/2017 | Quade et al. |
| 2018/0009500 A1 | 1/2018 | Lovold et al. |
| 2018/0326843 A1* | 11/2018 | Danielson .............. B60K 20/06 |
| 2018/0326847 A1* | 11/2018 | Landon .................. B62K 23/06 |
| 2019/0351836 A1 | 11/2019 | Chapdelaine et al. |
| 2019/0367117 A1 | 12/2019 | Fischer et al. |
| 2020/0010120 A1 | 1/2020 | Kinsman et al. |
| 2020/0171942 A1 | 6/2020 | Evans et al. |
| 2020/0384932 A1 | 12/2020 | Cooper et al. |
| 2021/0188184 A1 | 6/2021 | Kelso et al. |
| 2023/0331169 A1 | 10/2023 | Kelso et al. |

FOREIGN PATENT DOCUMENTS

| | | |
|---|---|---|
| CN | 201076344 Y | 6/2008 |
| CN | 101934769 A | 1/2011 |
| CN | 102015419 A | 4/2011 |
| CN | 102802981 A | 11/2012 |
| CN | 103101447 A | 5/2013 |
| CN | 108463402 A | 8/2018 |
| CN | 109415102 A | 3/2019 |
| CN | 306390450 | 3/2021 |
| DE | 0116605 C | 2/1900 |
| DE | 1755101 A1 | 4/1971 |
| DE | 3033707 A1 | 4/1982 |
| DE | 4136296 A1 | 5/1993 |
| DE | 19531985 A1 | 3/1997 |
| DE | 102005013610 A1 | 9/2006 |
| EP | 0238077 A2 | 9/1987 |
| EP | 0709247 A2 | 5/1996 |
| EP | 0794096 A2 | 9/1997 |
| EP | 1215107 A1 | 6/2002 |
| EP | 1296036 A2 | 3/2003 |
| EP | 1557345 A2 | 7/2005 |
| EP | 1564123 A2 | 8/2005 |
| GB | 0159650 A | 3/1921 |
| GB | 1501631 A | 2/1978 |
| JP | 06-105727 B2 | 12/1994 |
| JP | 11-334447 A | 12/1999 |
| JP | 2000-177434 A | 6/2000 |
| JP | 2004-308453 A | 11/2004 |
| WO | 03/53769 A1 | 7/2003 |
| WO | 2008/100398 A2 | 8/2008 |
| WO | 2008/115459 A1 | 9/2008 |

OTHER PUBLICATIONS

"2020 Fourtrax Recon" Honda., posted date Jun. 22, 2019 [online], [retrieved on Jul. 13, 2021], Retrieved from the Internet <URL: https://powersports.honda.com/atv/recutility/fourtrax-recon?year=2020> (Year: 2019).

"2022 Polaris Sportsman 450 H.O." Polaris., posted date Jun. 3, 2021 [online], [retrieved on May 4, 2022], Retrieved from the Internet <URL: https://premierpolaris.com/ATVs-Polaris-Sportsman-450-H-O-2022-Monroe-WA-e328a734-ecca-4aeb-ae9b-ad75007216abG> (Year: 2021).

"2022 TRX250X" Honda., posted date Feb. 8, 2022 [online], [retrieved on May 4, 2022], Retrieved from the Internet <URL: https: //powersports.honda.com/atv/sport/trx250x> (Year: 2022).

"LED Light Kit" Polaris., posted date Apr. 11, 2014 [online], [retrieved on May 4, 2022], Retrieved from the Internet <URL: https://atv.polaris.com/en-us/shop/accessories/lights/2884859/?utm_source=gmc&utm_medium=product_feed&utm_term=LED_Light_Kit> (Year: 2014).

"Sportsman 850" Polaris., posted date Jun. 29, 2017 [online], [retrieved on Jul. 13, 2021], Retrieved from the Internet <URL: https://atv.polaris.com/en-us/sportsman-850/> (Year: 2017).

International Preliminary Report on Patentability issued by the European Patent Office, dated Mar. 15, 2011, for International Patent Application No. PCT/US2009/059535; 6 pages.

International Preliminary Report on Patentability issued by the European Patent Office, dated May 11, 2009, for International Patent Application No. PCT/US2008/003483; 20 pages.

International Preliminary Report on Patentability issued by the European Patent Office, mailed Jan. 27, 2011, for ntemnational Patent Application No. PCT/US2009/049799; 13 pages.

International Search Report and Written Opinion issued by the European Patent Office, dated Aug. 27, 2008, for International Patent Application No. PCT/US2008/003485; 11 pages.

International Search Report and Written Opinion issued by the European Patent Office, dated Jan. 6, 2010, for International Patent Application No. PCT/US2009/059535; 10 pages.

International Search Report and Written Opinion issued by the European Patent Office, dated Oct. 2, 2008; for International Patent Application No. PCT/US2008/003483; 15 pages.

International Search Report and Written Opinion issued by the European Patent Office, dated Sep. 1, 2008, for International Patent Application No. PCT/US2008/003480; 17 pages.

International Search Report and Written Opinion issued by the International Searching Authority, dated Sep. 19, 2016, for International Patent Application No. PCT/US2016/031992; 20 pages.

International Search Report issued by the European Patent Office, mailed Feb. 24, 2010, for International Patent Application No. PCT/US2009/049799; 6 pages.

The Council of the European Communities, "Council Directive on the approximation of the laws of the Member States relating to the driver's seat on wheeled agricultural or forestry tractors (78/764/EEC) (OJL 255, 18.9, 1978)", Jul. 25, 1978, 69 pages, available at http://eurlex.europa.eu/LexUriServ/LexUriServ.do?uri=CONSLEG:1978L0764:20070101:EN.pdf.

(56) References Cited

OTHER PUBLICATIONS

Written Opinion issued by the International Searching Authority, mailed Feb. 24, 2010, for International Patent Application No. PCT/US2009/049799; 7 pages.

* cited by examiner

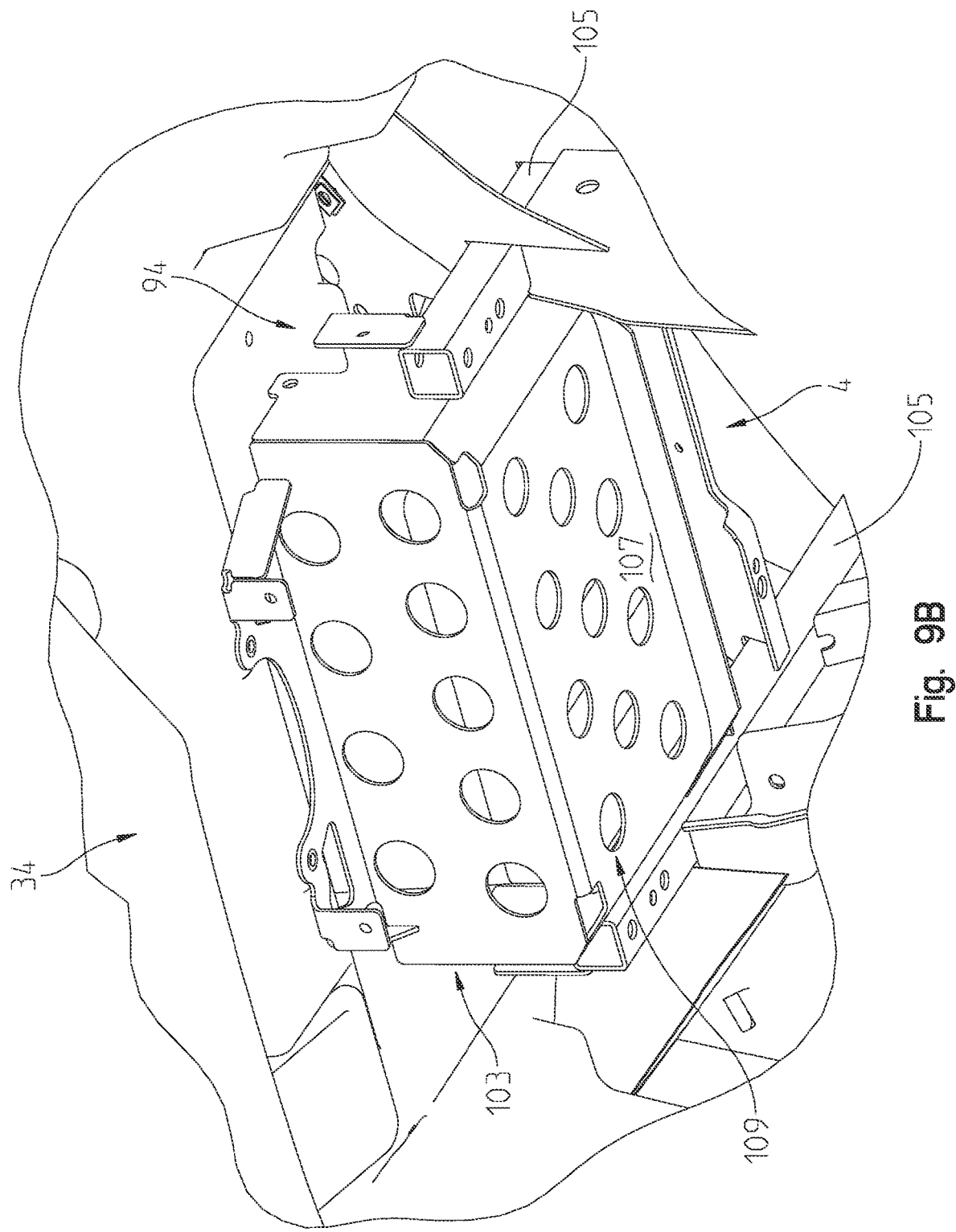

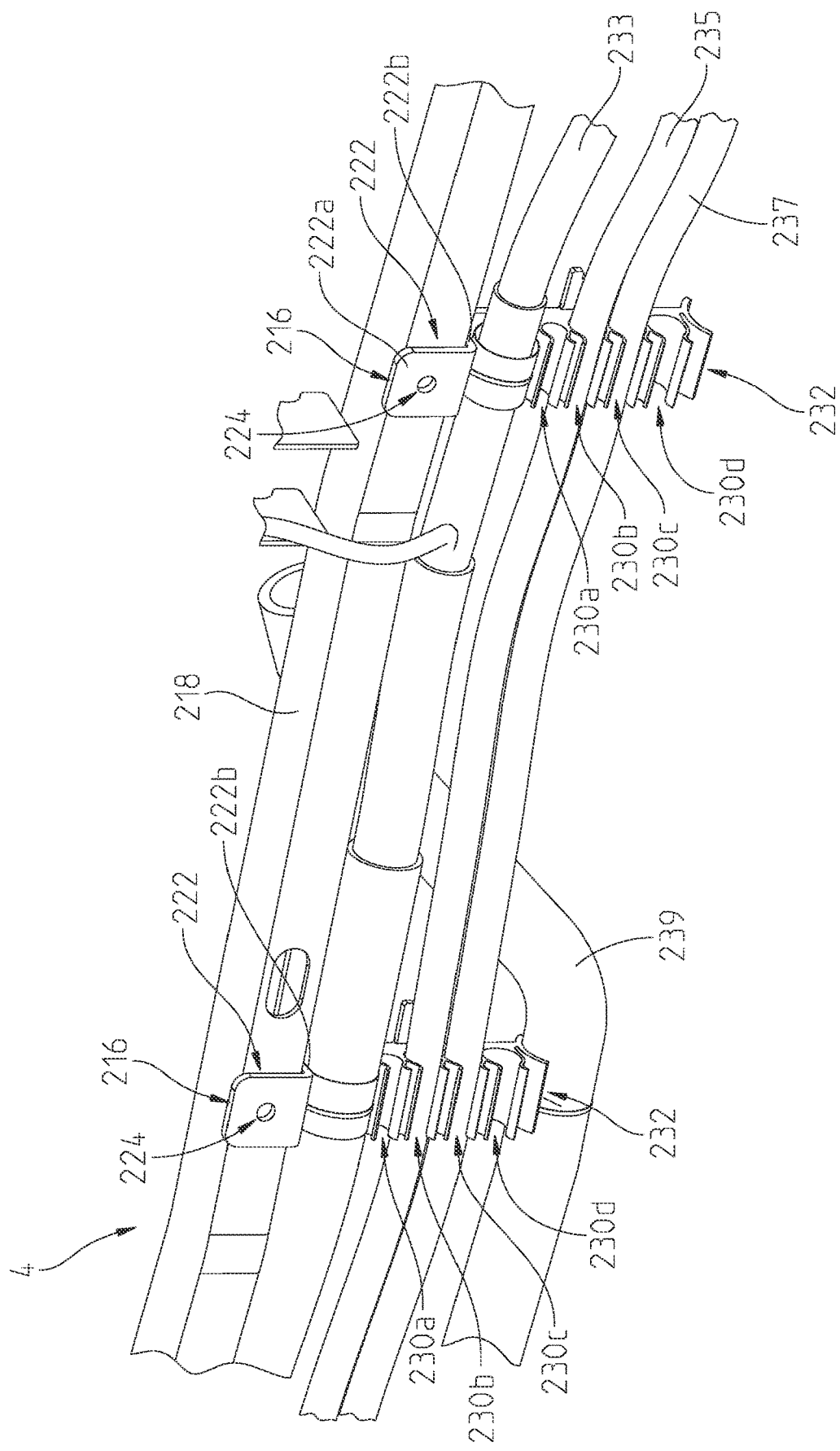

ALL-TERRAIN VEHICLE

CROSS-REFERENCE TO RELATED APPLICATION

The present application is a divisional of U.S. patent application Ser. No. 16/723,182, filed Dec. 20, 2019, the entire disclosure of which is incorporated herein by reference.

FIELD OF THE DISCLOSURE

The present disclosure relates generally to an all-terrain vehicle (hereinafter "ATV") and, more particularly, to an ATV having improved ergonomics and performance.

BACKGROUND OF THE DISCLOSURE

Generally, ATVs are used to carry one or two passengers and a small amount of cargo over a variety of terrains. Due to increasing recreational interest in ATVs, specialty ATVs, such as those used for trail riding, racing, and cargo hauling are in the market place. Most ATVs include an engine including between one and three cylinders. Most ATVs include a straddle or saddle type seat positioned above the engine. Examples of ATVs are disclosed in U.S. patent application Ser. No. 15/205,601, titled ALL-TERRAIN VEHICLE, filed Jul. 8, 2016, U.S. Pat. No. 9,873,316, titled ALL-TERRAIN VEHICLE, filed Mar. 13, 2014, U.S. Pat. No. 8,122,993, titled POWER STEERING FOR AN ALL TERRAIN VEHICLE, filed Aug. 14, 2008, and/or U.S. Pat. No. 8,215,694, titled ATV HAVING ARRANGEMENT FOR A PASSENGER, filed Oct. 7, 2008, the entire disclosures of which are incorporated herein by reference.

SUMMARY OF THE DISCLOSURE

In one exemplary embodiment of the present disclosure, an all-terrain vehicle is disclosed comprising a frame, a plurality of ground-engaging members supporting the frame relative to a ground surface, an outer body supported by the frame, and a cargo rack pivotably coupled to the outer body, the cargo rack including a hinge assembly comprising a first hinge leaf, a second hinge leaf complementary to the first hinge leaf, and a hinge pin inserted through the first hinge leaf and the second hinge leaf, wherein the cargo rack is moveable about the hinge pin between a closed position and an opened position.

In another exemplary embodiment of the present disclosure, an all-terrain vehicle is disclosed comprising a frame, a plurality of ground-engaging members supporting the frame relative to a ground surface, a steering assembly operatively coupled to at least one of the plurality of ground-engaging members, the steering assembly configured to steer the at least one of the plurality of ground-engaging members, a battery supported by the frame, and a light pod supported by the steering assembly, the light pod including a battery tender port electrically coupled to the battery and configured to receive an electrical connector for providing power to the battery.

In yet another exemplary embodiment of the present disclosure, an all-terrain vehicle is disclosed comprising a frame, a plurality of ground-engaging members supporting the frame relative to a ground surface, a seat assembly supported by the frame and configured to support an operator above the ground surface, a steering assembly adjacent the seat assembly and operatively coupled to at least one of the plurality of ground-engaging members, and a light pod supported by the steering assembly, the light pod including a side facing the steering assembly, and the light pod including at least one accessory port and an accessory plug inserted into the at least one accessory port.

In yet another exemplary embodiment of the present disclosure, an all-terrain vehicle is disclosed comprising a powertrain having an air intake portion, a throttle body assembly in fluid communication with the air intake portion of the powertrain, the throttle body assembly including a throttle body and a cam rotatably coupled to the throttle body, and an adjustable throttle limiter operably coupled to the cam, the adjustable throttle limiter being moveable between a first position corresponding to a first angular displacement of the cam and a second position corresponding to a second angular displacement of the cam, and the first angular displacement greater than the second angular displacement of the cam.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The above mentioned and other features of the invention, and the manner of attaining them, will become more apparent and the invention itself will be better understood by reference to the following description of embodiments of the invention taken in conjunction with the accompanying drawings.

FIG. 9B is a partial bottom perspective view of the electrical compartment of FIG. 7 mounted on a chassis of the ATV of FIG. 1;

FIG. 15 is a perspective view of a plurality of multi-component routing clips of the ATV of FIG. 1;

Figure 1:
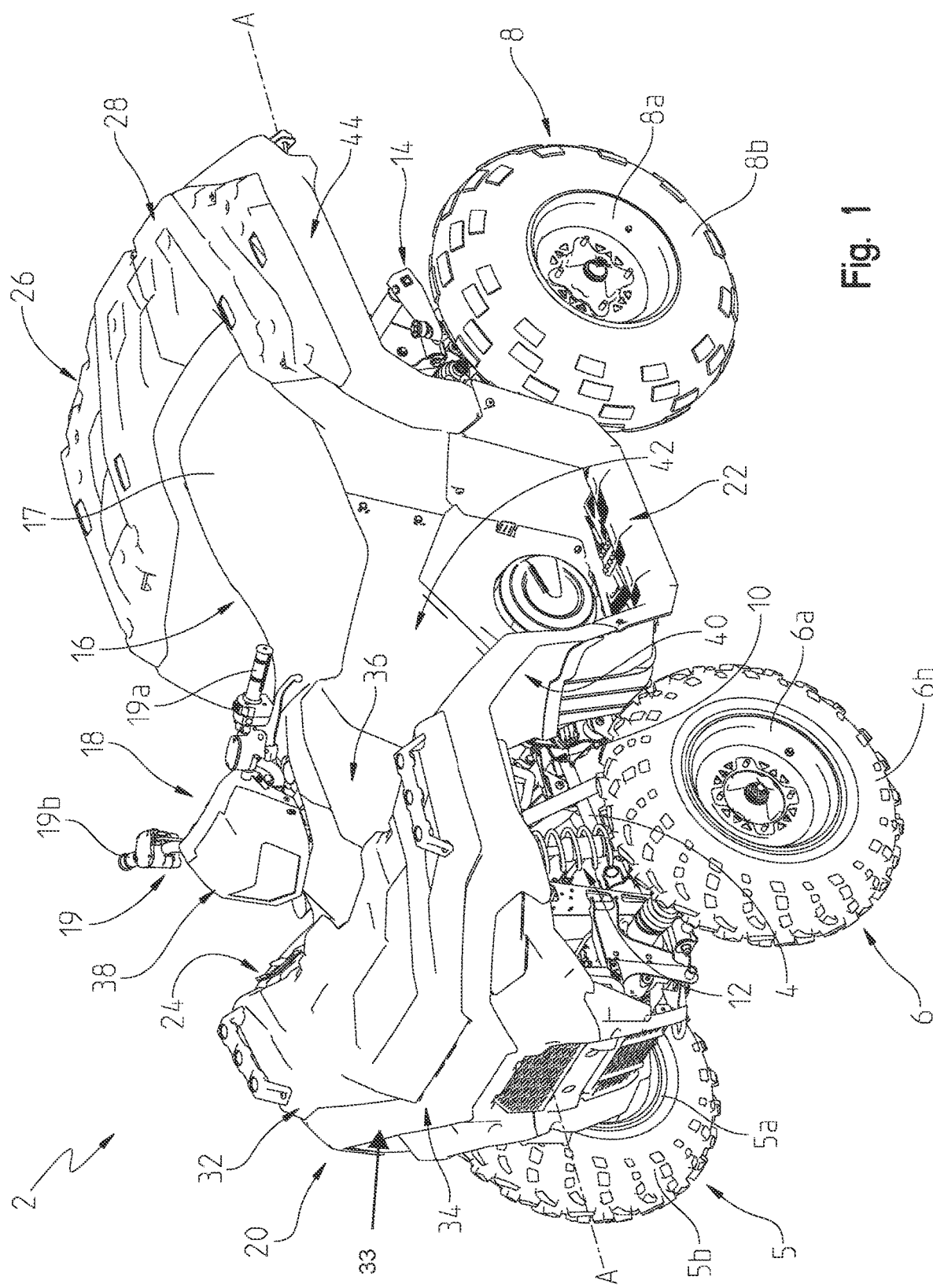
FIG. 1 is a left front perspective view of an illustrative ATV of the present disclosure.

Corresponding reference characters indicate corresponding parts throughout the several views. Although the drawings represent embodiments of various features and components according to the present disclosure, the drawings are not necessarily to scale, and certain features may be exaggerated to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to an ATV, it should be understood that the features disclosed herein may have application to other types of vehicles such as utility vehicles, motorcycles, watercraft, snowmobiles, people movers, and golf carts.

With reference to FIG. 1, a vehicle 2 is shown as an all-terrain vehicle including a frame 4 coupled to and supported by front ground-engaging members 6 and rear ground-engaging members 8. ATV 2 travels relative to a ground surface on front ground-engaging members 6 and rear ground-engaging members 8. Front ground-engaging members 6 include wheels 6a and tires 6b, and rear ground-engaging members 8 include wheels 8a and tires 8b. ATV 2 generally includes a powertrain 10. Front ground-engaging members 6 are coupled to frame 4 by way of a front suspension 12, and rear ground-engaging members 8 are coupled to frame 4 by way of a rear suspension 14. ATV 2 further includes a seat assembly 16, illustratively a saddle or straddle type seat 17. While seat assembly 16 as shown in FIG. 1 is for a single rider or operator, it is contemplated that ATV 2 may be modified to incorporate two riders as described in U.S. Pat. No. 8,678,464 or 8,430,442, the disclosures of which are incorporated herein by reference. ATV 2 also includes a steering assembly 18 for steering at least front ground-engaging members 8. Steering assembly 18 could be similar to that described in U.S. Pat. No. 8,122,993, titled POWER STEERING FOR AN ALL TERRAIN VEHICLE, filed Aug. 14, 2008. In the illustrative embodiment shown, steering assembly 18 includes handlebars 19, illustratively left handlebar 19a and right handlebar 19b. Handlebars 19 could include at least one operator input for controlling one or more features or characteristics of ATV 2 such as, for example, the throttle.

ATV 2 includes an outer body 20, generally formed of a plastic material. Outer body 20 may include at least a footwell 22 for placement of a rider's foot while riding. ATV 2 also includes a forward storage area 24 positioned forward of steering assembly 18 and a rear storage area 26 positioned rearward of seat 17. Rear storage area 26 includes a U-shaped or C-shaped rear cargo rack 28 configured to support cargo. In the embodiment shown, cargo rack 28 surrounds at least a portion of seat 17. It should be appreciated that cargo rack 28 could include integrated tie downs such as those described in U.S. Pat. No. 8,905,435, the entire disclosure of which is incorporated herein by reference. As will be described in more detail herein, forward storage area 24 includes a front cargo rack 32 configured to support cargo. It should be appreciated that front rack 32 may also include a plurality of integrated tie downs. Outer body 20 may further include front body panel 33 including front fascia 34 and front fairing 36, light pod 38, inner panel 40, side panel 42, and fender body panels 44. In various embodiments, front fascia 34 and front fairing 36 of front body panel 33 may be a single integral piece, while in other various embodiments, front fascia 34 and front fairing 36 of front body panel 33 may be multiple pieces.

Figure 2:
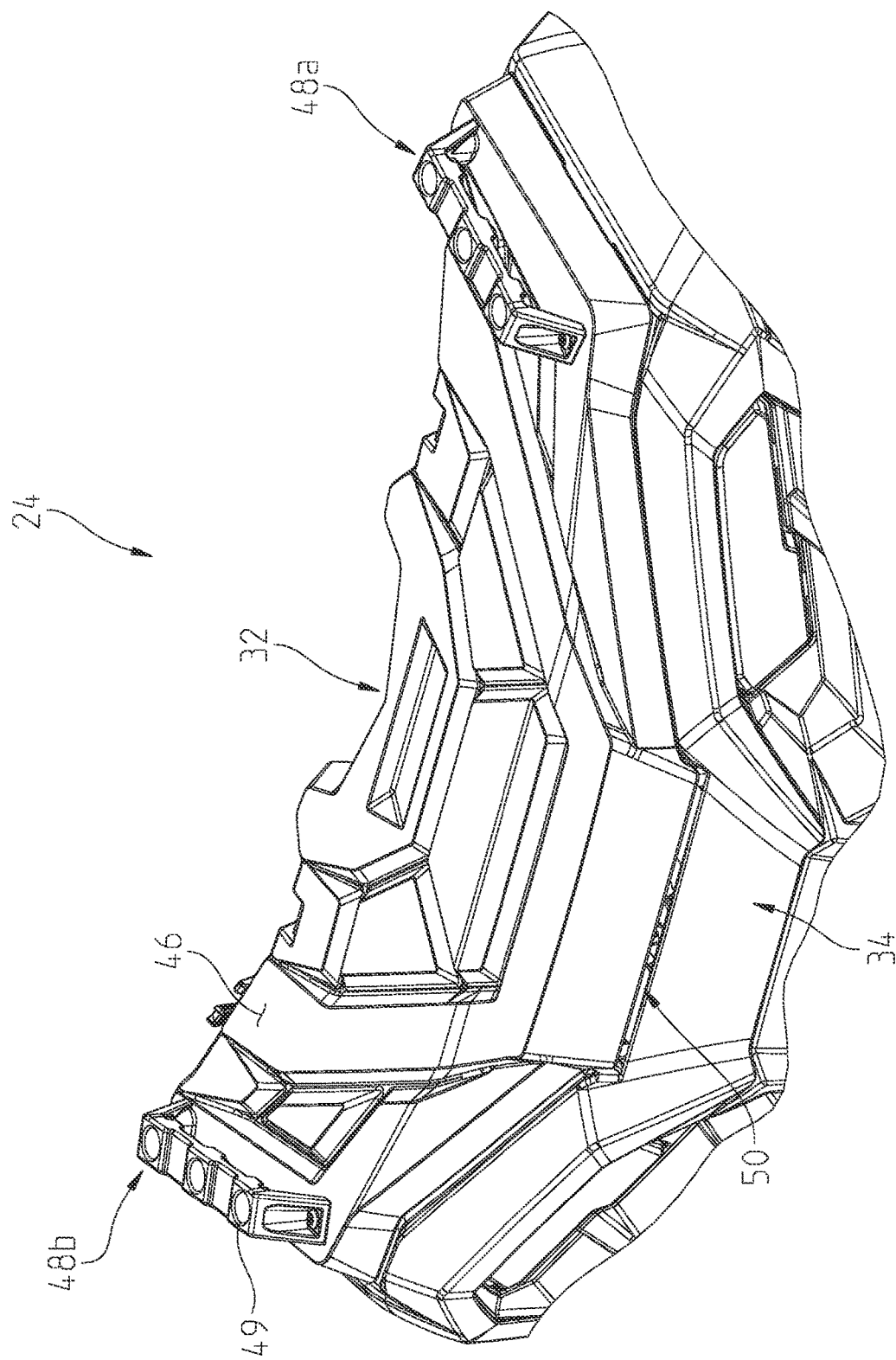
FIG. 2 is a left front perspective view of a front rack and storage area cover of the ATV of FIG. 1 in a fully closed position.
Figure 3:
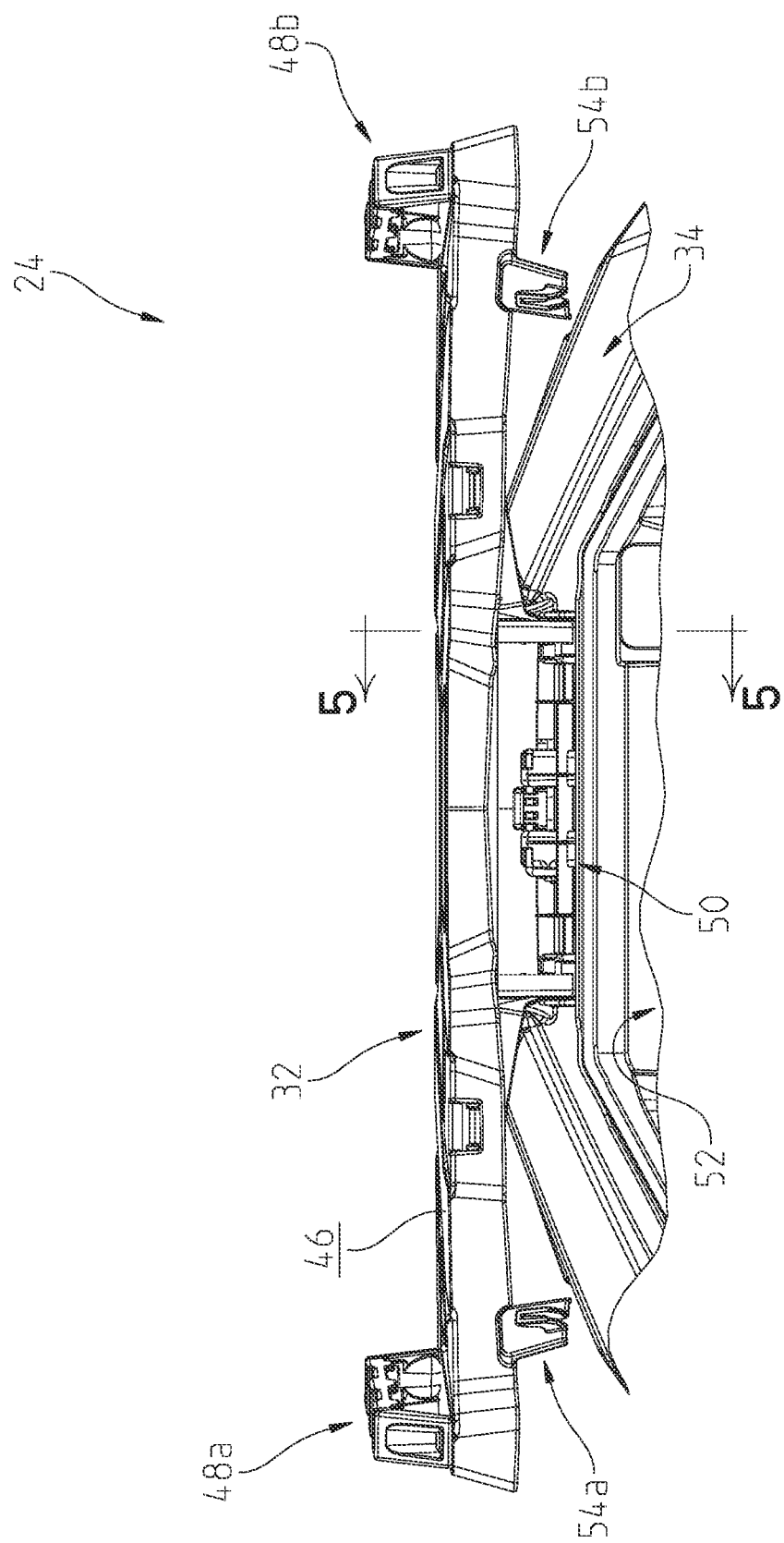
FIG. 3 is a rear perspective view of the front rack and storage area cover of FIG. 2 in a partially opened position.

With reference now to FIGS. 2-12, forward storage area 24 is shown in more detail. Referring initially to FIGS. 2 and 3, front cargo rack 32 includes a generally flat upper surface 46 configured to support cargo. A plurality of handles 48, illustratively a left handle 48a and a right handle 48b, are coupled to upper surface 46 and are configured to be grasped by an operator. Handles 48 may also comprise tie downs 49 for securing cargo to front rack 32. In one embodiment, handles 48 are integrally formed with upper surface 46; however, in other embodiments, handles 48 are removably coupled to upper surface 46.

Front rack 32 is pivotally coupled to front fascia 34 at a hinge assembly 50. Accordingly, front rack 32 is pivotable between a fully closed position (see FIG. 2) in which upper surface 46 of front rack 32 is generally parallel to a ground surface and a fully opened position (see FIG. 5) in which front rack 32 is generally perpendicular to the ground surface. In this way, front rack 32 is generally pivotable between approximately 90 degrees. In various embodiments, front rack 32 may be configured to rotate beyond 90 degrees up to approximately 110 degrees such that front rack 32 is capable of remaining open on its own with the aid of gravity.

Front rack 32 provides access to a forward storage bin or compartment 52, which is sized and adapted to store cargo such as, for example, tools or gloves. In this way, front rack 32 is a lid or cover for storage compartment 52 and also forms part of outer body 20. Front rack 32 is coupled to front body panel 33, and includes at least one catch, illustratively a left catch 54a and a right catch 54b, for securing front rack 32 to front body panel 33. Accordingly, front fascia 34 and/or front fairing 36 of front body panel 33 may include a matching latch (not shown) such as, for example, a flexible handle latch for engaging a respective one of catches 54a, 54b. It is contemplated, however, that front rack 32 may include one or more latches while front fascia 34 and/or front fairing 36 includes one or more corresponding catches. It is also contemplated that front rack 32 may securely latch to front fascia 34 and/or front fairing 36 using one or more locks. In embodiments, front rack 32 may latch to front fascia and/or front fairing 36 using a cable latch system. Either of front rack 32 or a perimeter of storage compartment 52 may include a seal, or complementary parts of front rack 32 and storage compartment 52 may form a seal when front rack 32 is in the fully closed position, to assist with keeping water, dust, and other debris from entering storage compartment 52. In this way, a seal is at least formed or defined when front rack 32 is in the closed position and adjacent or in contact with storage compartment 52, front fascia 34, and/or front fairing 36.

Figure 4:
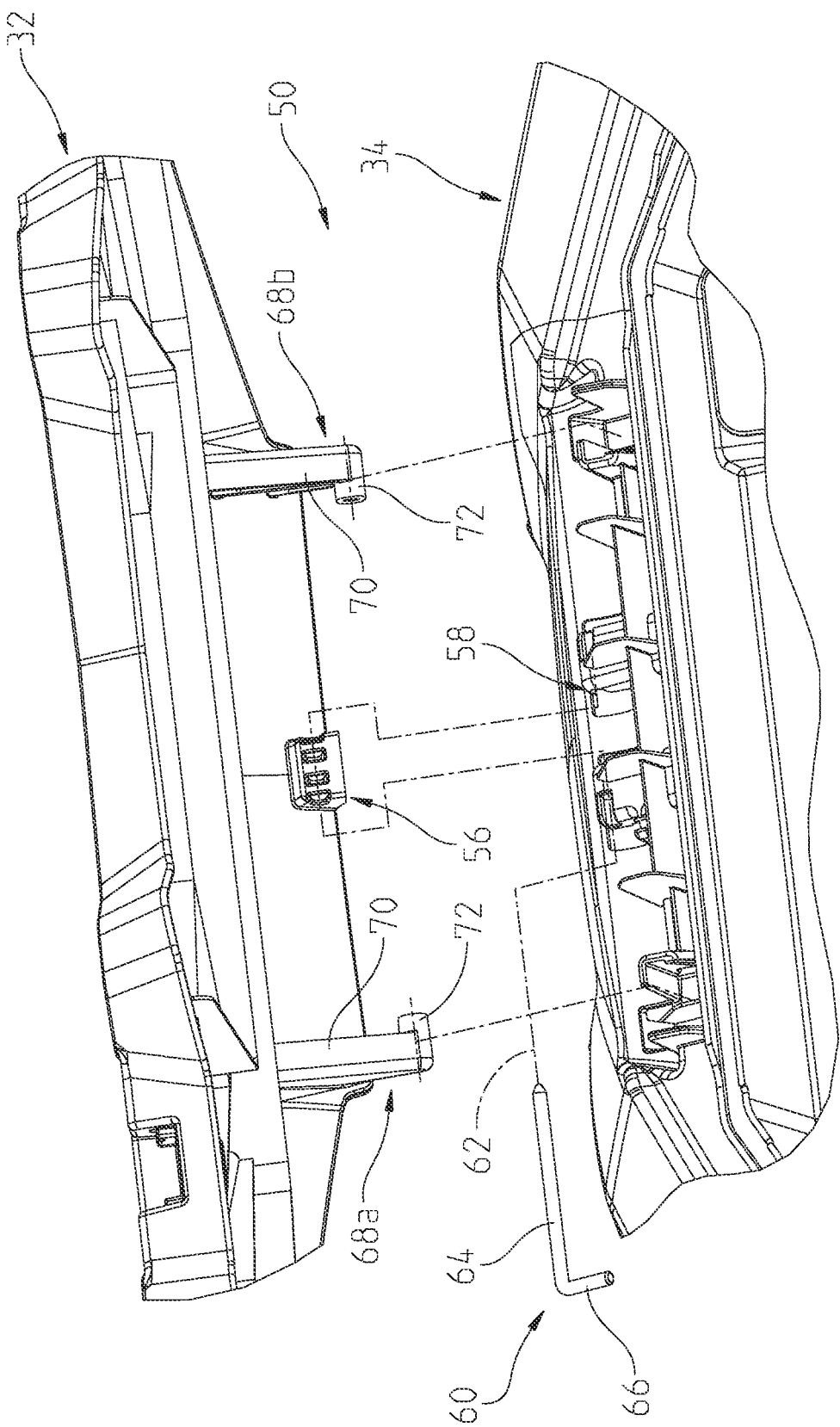
FIG. 4 is an exploded view of a hinge assembly of the front rack and storage area cover of FIG. 3.
Figure 5:
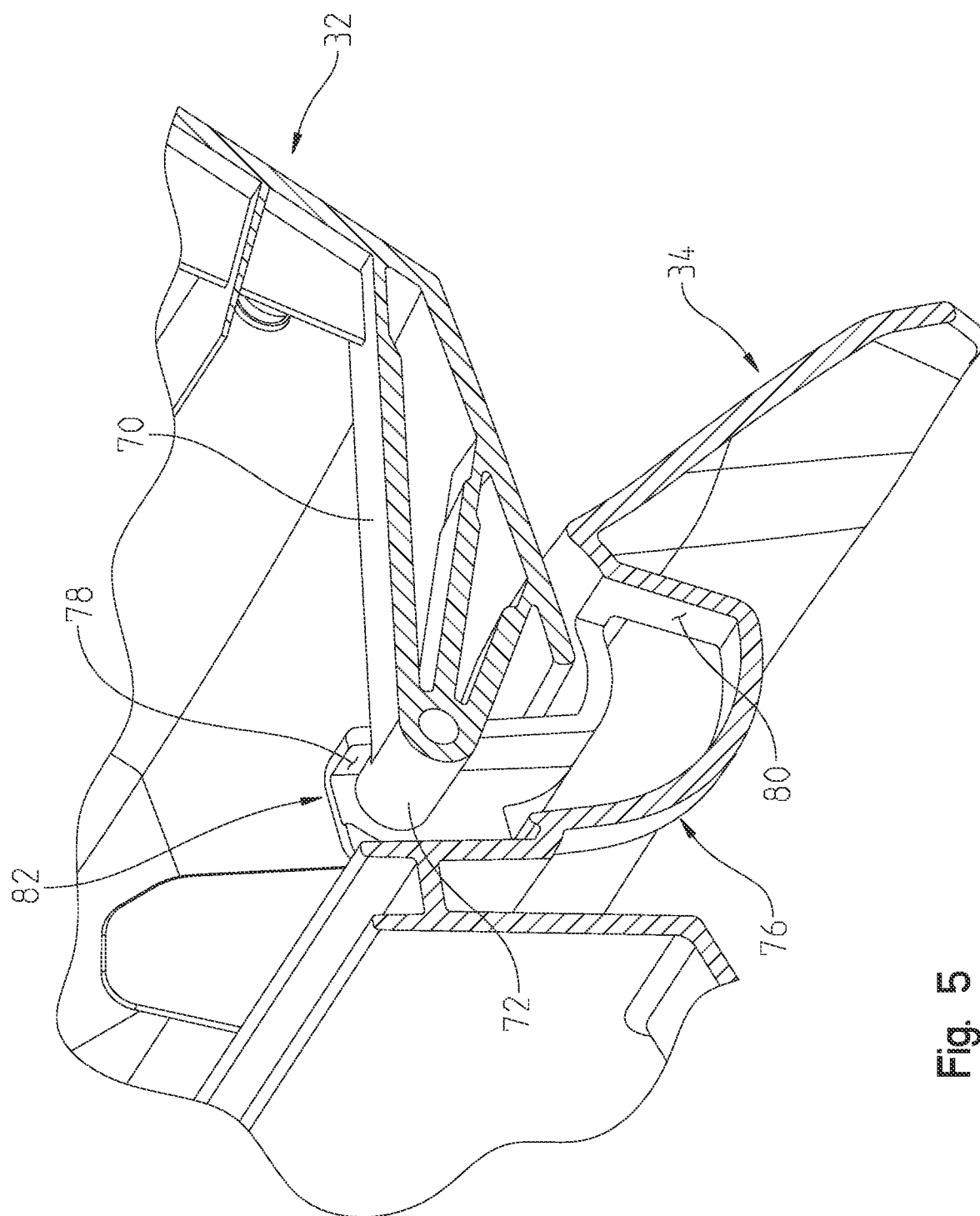
FIG. 5 is a partial cross-sectional view of the hinge assembly of the front rack and storage area cover taken along lines 5-5 of FIG. 3 with the front rack and storage area cover in a fully opened position.
Figure 6:
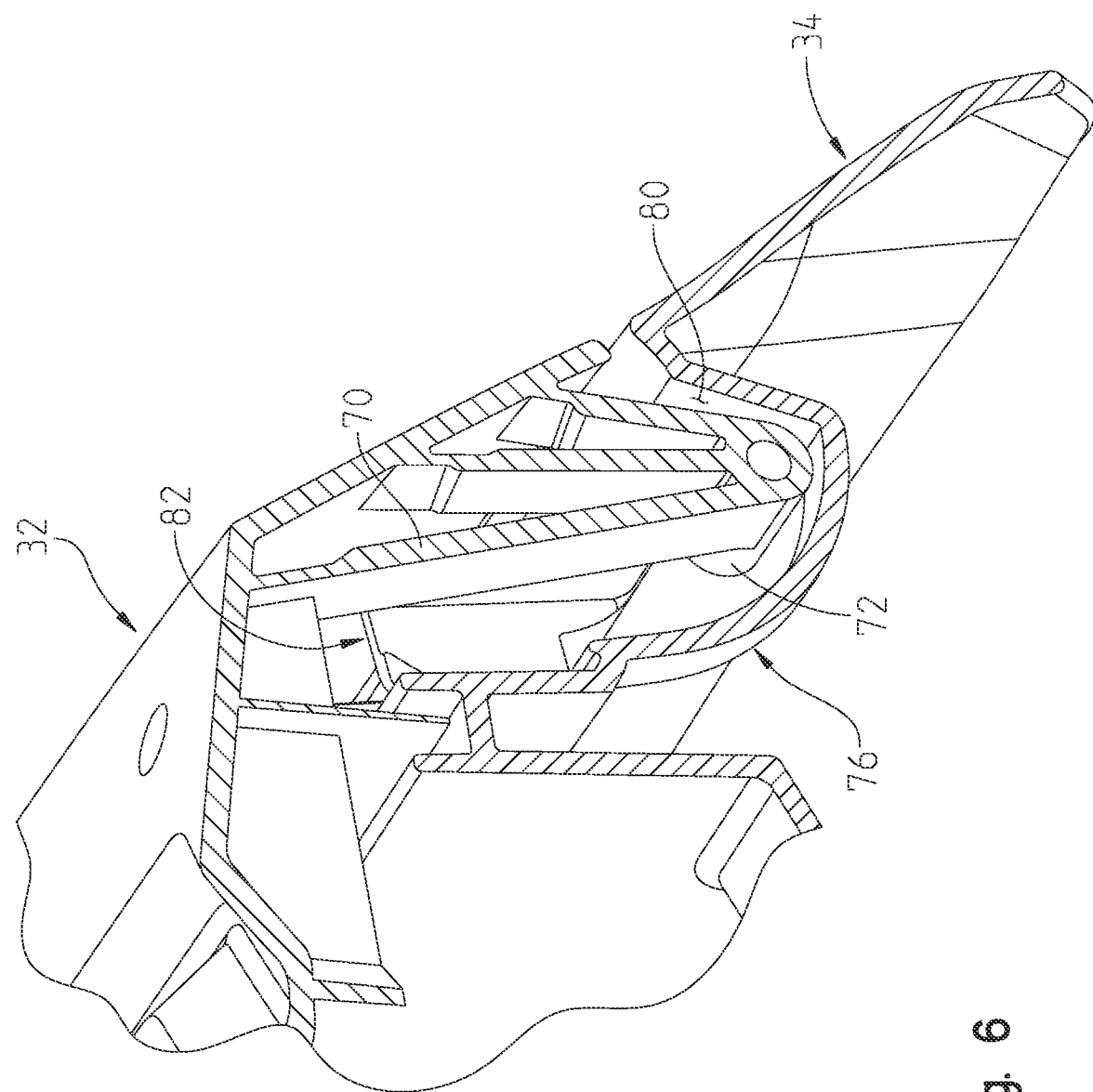
FIG. 6 is a partial cross-sectional view of the hinge assembly of the front rack and storage area cover taken along lines 5-5 of FIG. 3 with the front rack and storage area cover in the fully closed position.
Figure 7:
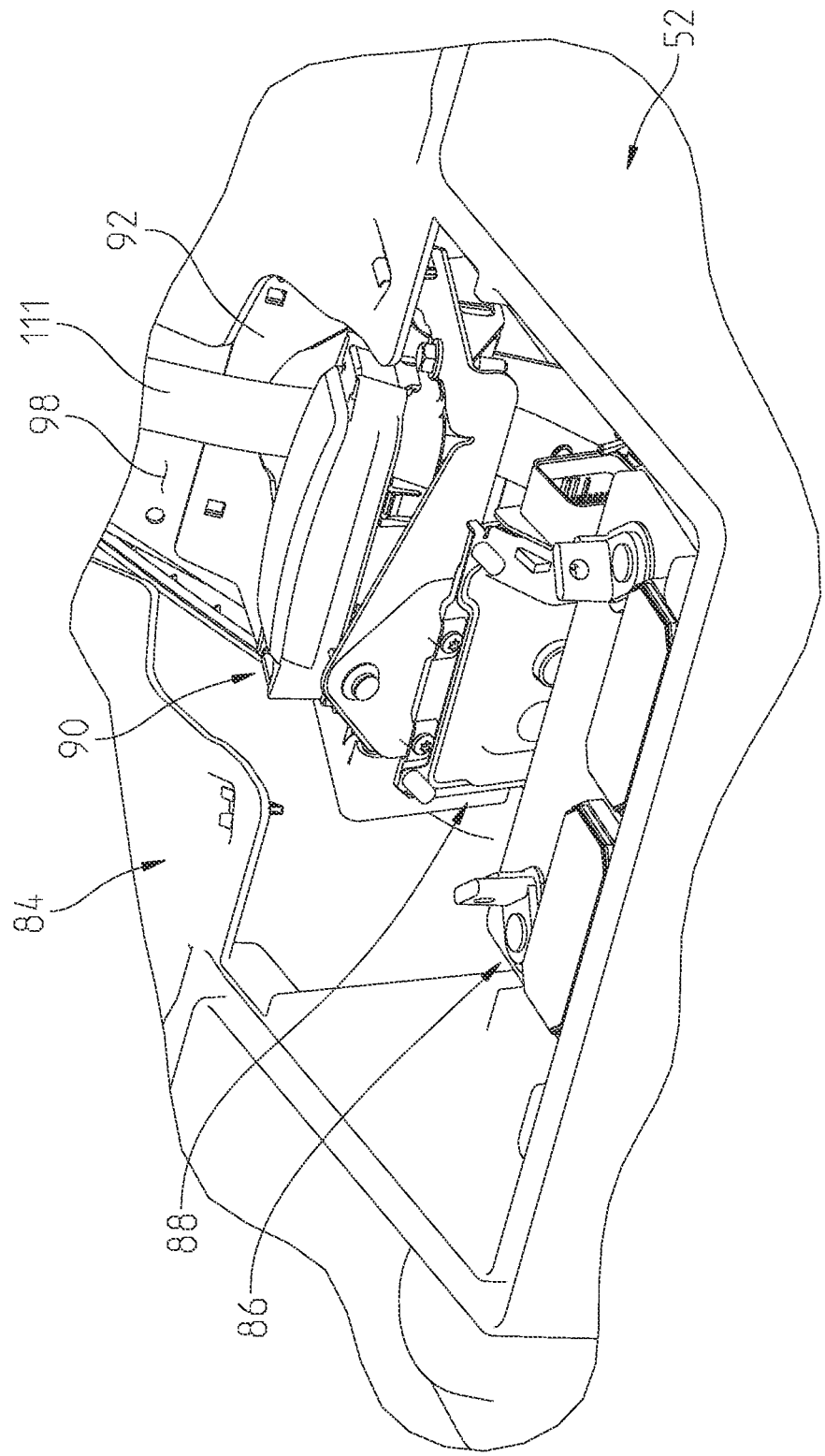
FIG. 7 is a front left perspective of an electrical compartment of a front storage area of the ATV of FIG. 1.

Referring now to FIGS. 4-6, hinge assembly 50 of front rack 32 is shown in more detail. Hinge assembly 50 includes a hinge leaf 56 that is received within a complementary hinge leaf 58 of front fascia 34. More specifically, a hinge pin 60 is inserted through hinge leaf 58 of front fascia 34 and hinge leaf 56 of front rack 32 to rotatably couple and secure front rack 32 to front fascia 34. In this way, hinge pin 60 defines a hinge axis 62 of hinge assembly 50, which is illustratively perpendicular to a longitudinal axis A (see FIG. 1) of ATV 2 and is approximately perpendicular to vertical. In the embodiment shown, hinge pin 60 comprises an L-shaped body having a main or first leg 64 and a second leg 66 oriented generally perpendicular to first leg 64. First leg 64 is arranged along hinge axis 62 and passes through hinge leaves 56, 58. A distal end of first leg 64 is adapted to facilitate passing first leg 64 through hinge leaves 56, 58. Second leg 66 defines both a handle and an axial stop for hinge pin 60 when first leg 64 is inserted into hinge leaves 56, 58. More particularly, when first leg 64 is inserted through hinge leaves 56, 58, second leg 66 abuts a portion of hinge leaf 56 and/or hinge leave 58 to prevent further insertion of hinge pin 60. While hinge pin 60 has been described as having a first leg and a second leg, it is contemplated that other designs of hinge pin 60 are possible to rotatably join front rack 32 and front fascia 34 and maintain the position of hinge pin 60 when front rack 32 is assembled with front fascia 34.

Hinge assembly 50 also includes at least one stop, illustratively a left stop 68a and a right stop 68b, configured to prevent front rack 32 from opening further than the fully opened position of FIG. 5. Stops 68a, 68b, therefore, also indicate to a user that front rack 32 is in the fully opened position. In the embodiment shown, each of front rack 32 and front fascia 34 include complementary components of stops 68a, 68b. Referring specifically to FIGS. 5 and 6, each of stops 68a, 68b includes a leg 70 extending distally from front rack 32. Distally extending leg 70 includes a protrusion 72 proximate a distal end of leg 70. Protrusion 72 is illustratively cylindrical and extends generally perpendicular to leg 70. Front fascia 34 includes a channel or guide 76 sized and configured to receive at least one of leg 70 and protrusion 72. In the embodiment shown, guide 76 is generally arcuate in shape and guides protrusion 72 as front rack 32 rotates about hinge axis 62 between the fully closed position and the fully opened position. More particularly, protrusion and/or a portion of leg 70 rotates within guide 76 during movement of front rack 32.

Referring still to FIGS. 5 and 6, front fascia 34 includes a surface 78 that protrusion 72 abuts when front rack 32 is in the fully opened position (see FIG. 5). In the embodiment shown, surface 78 prevents front rack 32 from rotating about hinge axis 62 further than the fully opened position. In this way, surface 78 at least partially defines stops 68a, 68b. More particularly, the interaction of protrusion 72 with surface 78 may provide feedback to an operator that front rack 32 is in the fully opened position. In embodiments, guide 76 may include another surface 80 that protrusion 72 abuts when front rack 32 is in the fully closed position of FIG. 6.

Illustratively, at least one end 82 of guide 76 (e.g., an upper end) is open to facilitate disassembly of hinge assembly 50 and removal of front rack 32 from front fascia 34. In the embodiment shown, hinge leaves 56, 58 and stops 68 are integrally formed with the respective one of front rack 32 and front fascia 34 to form a single piece construction.

Turning now to FIGS. 7-11, an electrical compartment 84 of ATV 2 is shown in more detail. Electrical compartment 84 of ATV 2 is positioned within or adjacent front storage compartment 52. Accordingly, electrical compartment 84 is positioned longitudinally forward of steering assembly 18 and houses, among other things, a battery 86, an engine control unit ("ECU") 88, a fuse compartment or holder 90, and a mounting bracket 92. In the embodiment shown, electrical compartment 84 is accessible when front rack 32 is opened (e.g., the fully opened position of FIG. 5).

Figure 8:
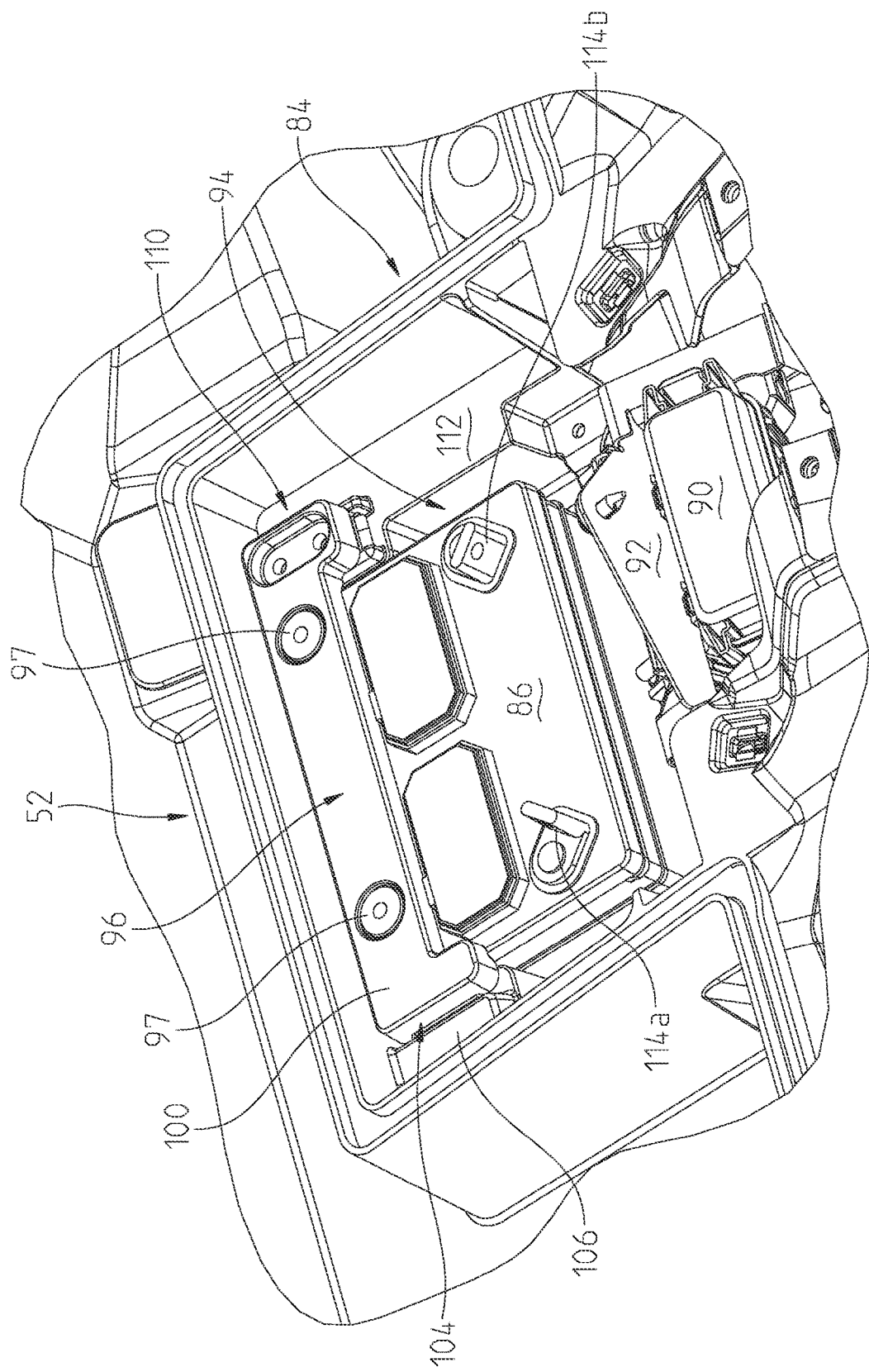
FIG. 8 is a top perspective view of the electrical compartment of FIG. 7.
Figure 9A:
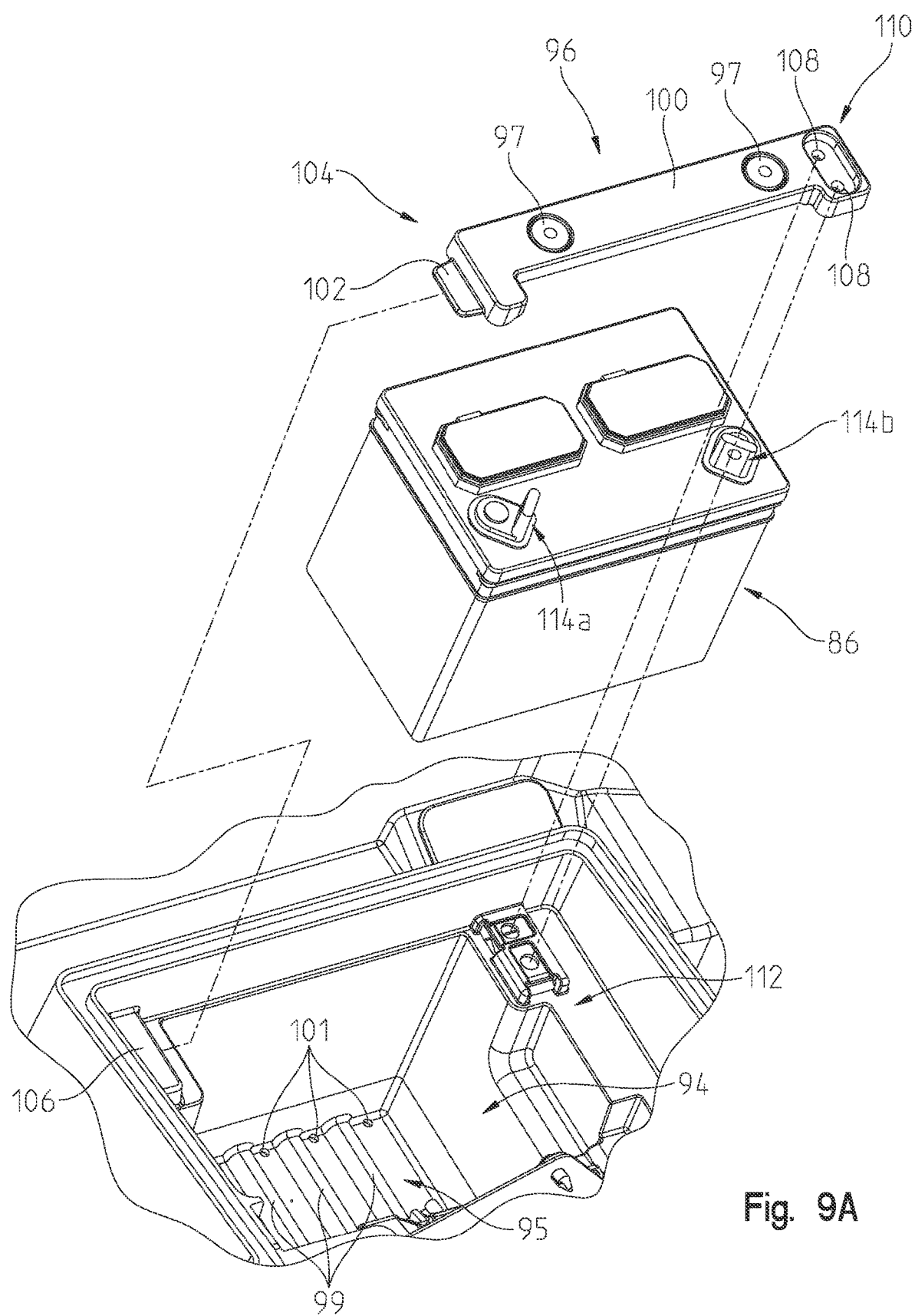
FIG. 9A is a partial exploded view of the electrical compartment of FIG. 7.

Referring specifically to FIGS. 8-9B, battery 86 is shown mounted within electrical compartment 84. Battery 86 is received within a battery tray or well 94 and is secured using at least one battery hold down or clamp 96. Battery well 94 illustratively comprises a molded plastic that surrounds or encapsulates battery 86. As shown in FIG. 9A, battery 86 is supported on a floor 95 of battery well 94, which includes a plurality of corrugations 99 that provide a raised surface supporting battery 86 as well as a space for dirt, debris, or water to collect. Floor 95 also includes at least one drain hole 101 positioned intermediate corrugations 99 to provide an outlet for any water within battery well 94.

As shown in FIG. 9B, battery well 94 is supported on a mounting bracket 103 of frame 4. In some embodiments, battery well 94 may be coupled to mounting bracket 103 using, for example, one or more fastener. In other embodiments, battery well 94 may be supported by mounting bracket 103 while front fascia 34 is coupled to frame 4. Mounting bracket 103 illustratively comprises a structural member of frame 4 and is coupled to rails 105 of frame 4. In some embodiments, mounting bracket 103 may be coupled to rails 105 using at least one fastener. In other embodiments, mounting bracket 103 may be welded to rails 105.

In the embodiment shown, mounting bracket 103 comprises a box at least partially surrounding and supporting battery well 94. A floor 107 of mounting bracket 103 includes at least one opening 109 sized to permit water from drain hole 101 to pass through. As a result, battery 86 is positioned longitudinally forward of a firewall 98 (see FIG. 7) and steering assembly 18 of ATV 2. Firewall 98 may be a panel or other assembly or component which separates at least the operator area (e.g., seat assembly 16) from electrical compartment 84. Illustratively, firewall 98 may be positioned adjacent a portion of steering assembly 18, for example generally below a portion of handlebars 19. An advantage, among others, of battery well 94 is a reduction in cost by incorporating battery well 94 into front fascia 34 while increasing the extent of protection provided to battery 96.

In the embodiment shown, battery 86 is intersected by longitudinal axis A of ATV 2 and is laterally oriented generally perpendicular to longitudinal axis A. It is contemplated, however, that battery 86 may be oriented parallel to longitudinal axis A or may be positioned substantially or entirely on one lateral side of longitudinal axis A.

Battery clamp 96 comprises a laterally-extending body 100 having a flange 102 at a first end 104 configured to be received in a sidewall 106 of battery well 94 or electrical compartment 84 and a plurality of apertures 108 at a second end 110 of body 100. Second end 110 of body 100 is secured to a flange 112 of battery well 94 or electrical compartment 84 with removable fasteners (not shown) to secure battery 86 within battery well 94. In this way, battery 86 may be removed from vehicle 2 by pivoting cargo rack 32 to an open position, removing fasteners from second end 110, and laterally moving clamp 96 to disengage flange 102 from first end 104 of sidewall 106. With clamp 96 removed, battery 86 is accessible for repair, cleaning, replacing, testing, etc. Body 100 of clamp 96 illustratively comprises a rigid plastic such as, for example, a glass filled polypropylene. It is contemplated, however, that clamp 96 may comprise, for example, a rubber strap, bungee cord, or other retaining member. Battery clamp 96 also includes at least one vibration isolator 97 pressed into an upper surface of body 100. Isolators 97 illustratively comprise a synthetic rubber, specifically ethylene propylene diene monomer ("EPDM") rubber configured to reduce the magnitude or extent of vibrations battery 86 is exposed to during operation of ATV 2. Illustratively, battery 86 comprises a 12-volt valve-regulated lead-acid absorbent glass mat battery having protruding terminals, illustratively terminals 114a, 114b. It is contemplated, however, that battery 86 comprise a different type or shape of battery than illustrated.

Figure 10:
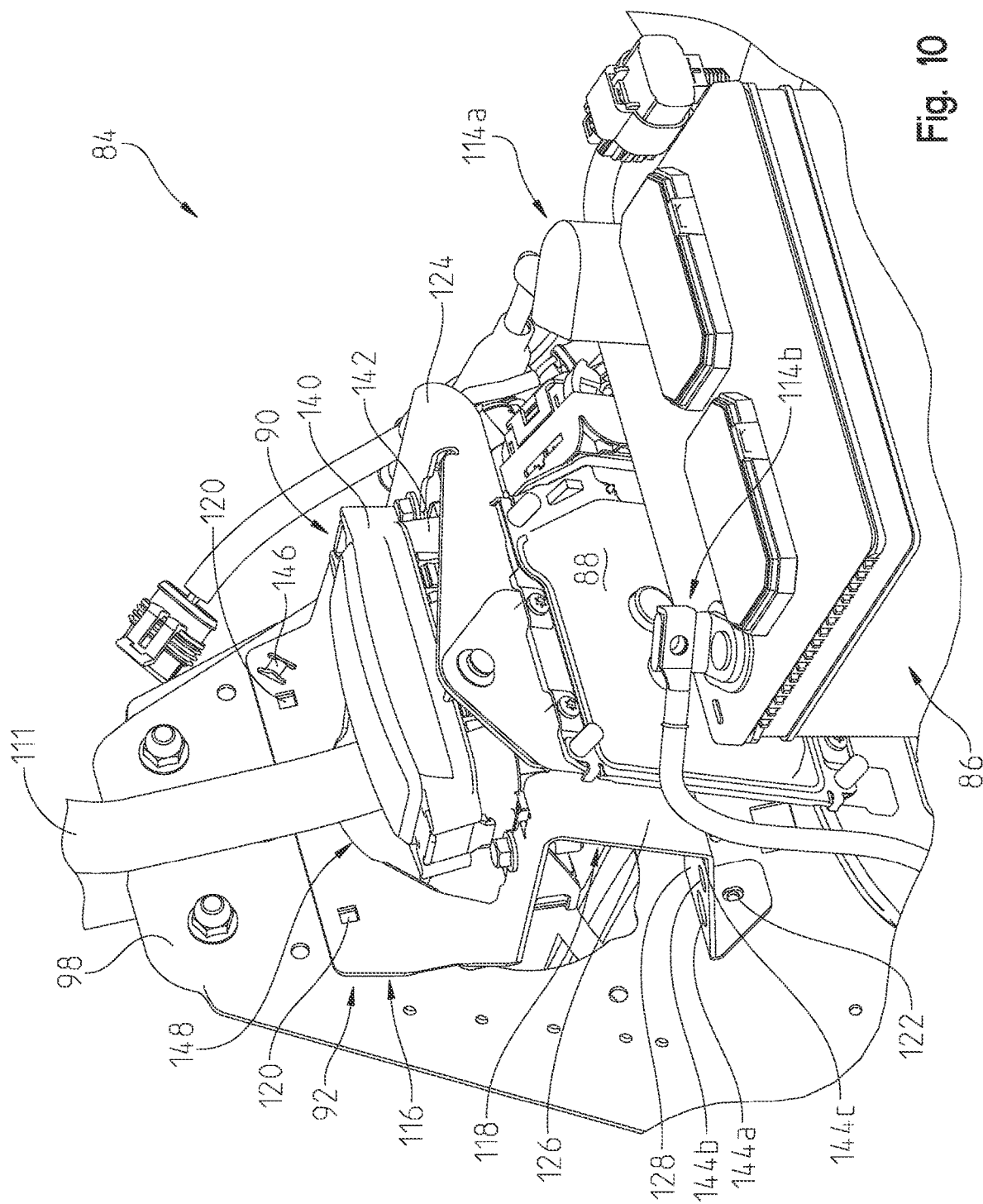
FIG. 10 is a front right perspective view of the electrical compartment of FIG. 7.
Figure 11:
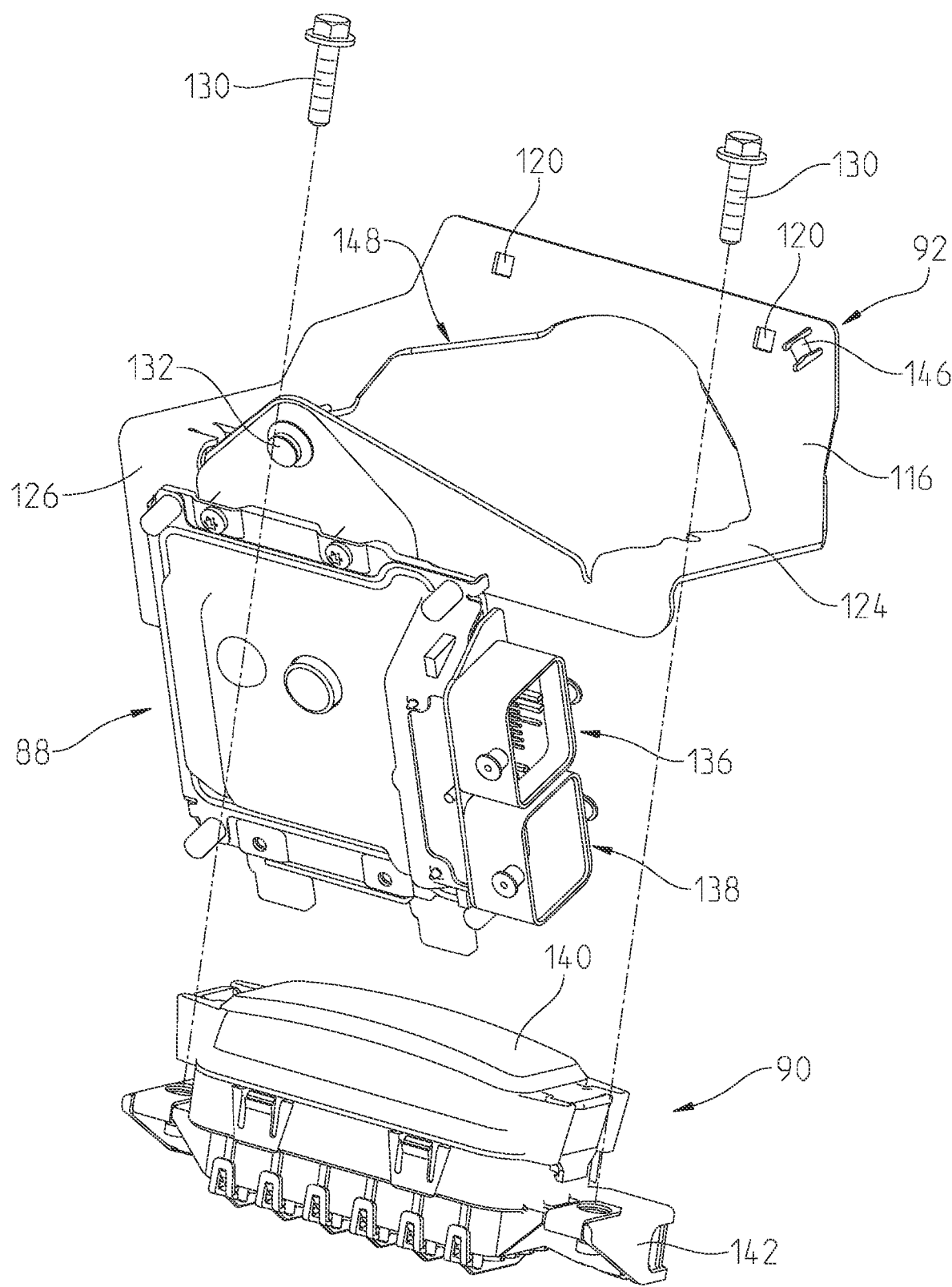
FIG. 11 is a partial exploded view of a mounting bracket, an engine control unit, and a fuse pod or holder or fuse block of the electrical compartment of FIG. 10.
Figure 12:
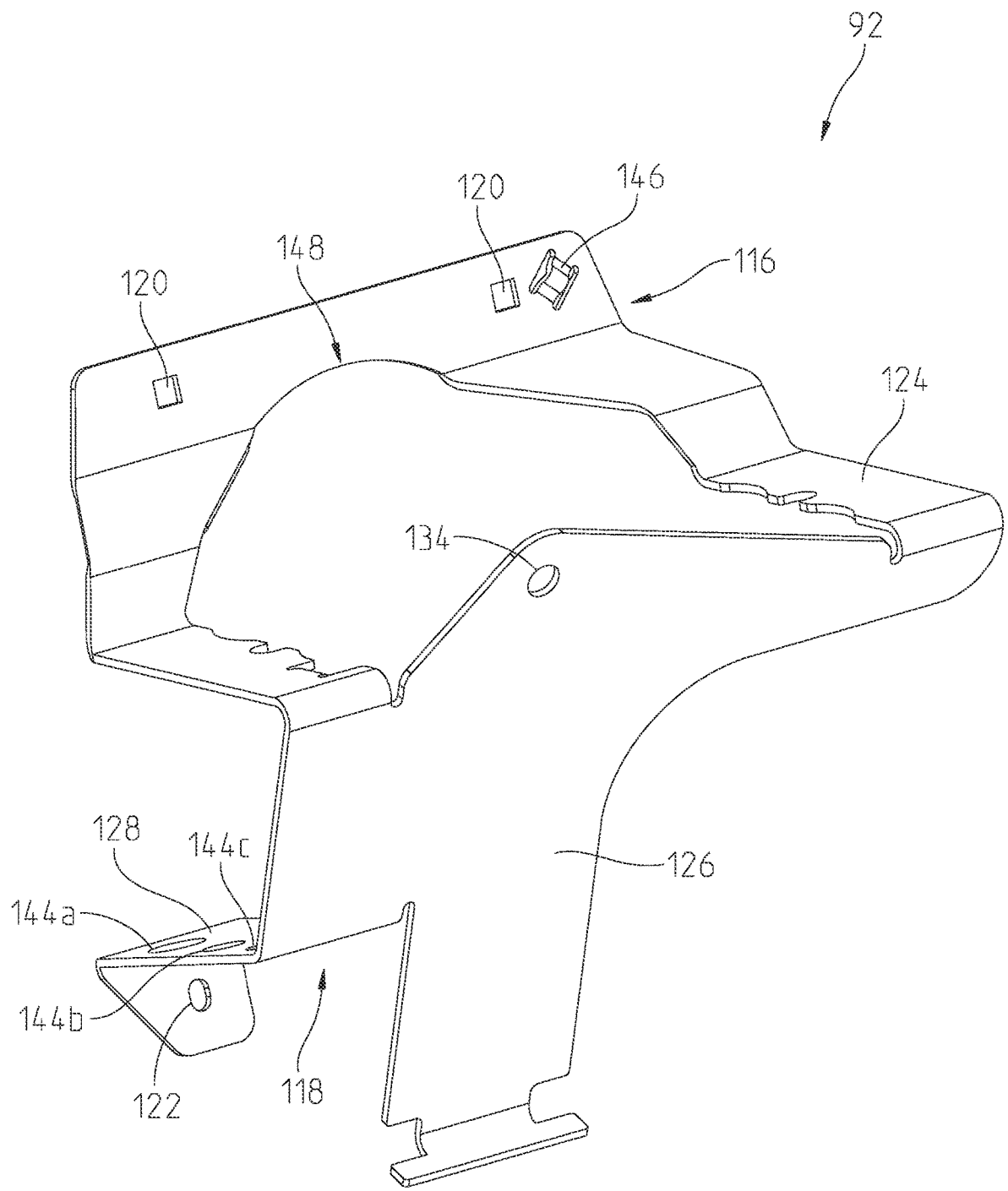
FIG. 12 is a perspective view of the mounting bracket of FIG. 11.

Referring now to FIGS. 10-12, ECU 88, fuse holder 90, and mounting bracket 92 are shown in more detail. Illustratively, ECU 88, fuse holder 90, and mounting bracket 92 are positioned longitudinally intermediate firewall 98 and battery 86. Mounting bracket 92 is adjacent and/or mounted to firewall 98, and ECU 88 and fuse holder 90 are supported by mounting bracket 92. Accordingly, mounting bracket 92 includes an upper, generally vertical flange 116 and a lower, generally vertical flange 118, which are configured to couple to firewall 98. Specifically, flanges 116, 118 each include at least one respective aperture 120, 122 for receiving a fastener or stud for coupling to firewall 98. A horizontal flange 124 extends outwardly from upper vertical flange 116 along longitudinal axis A of ATV 2 to join together upper and lower flanges 116, 118. In various embodiments, mounting bracket 92 may include an opening (not shown) configured to receive an accessory fuse relay, accessory fuse holder, or the like such that the accessory fuse relay, accessory fuse holder or the like may be attached to mounting bracket 92.

Lower flange 118 includes a vertical portion 126 which extends downwardly from horizontal flange 124 and a horizontal portion 128 which extends along longitudinal axis A toward firewall 98 from vertical portion 126. Horizontal portion 128 includes at least one opening or aperture 144, illustratively apertures 144a, 144b, 144c, sized and shaped to route or guide a variety of components of ATV 2. In the embodiment shown, apertures 144 of horizontal portion 128 route vent lines for a transmission of powertrain 10, lines, wires, or conduits for a front drive of powertrain 10, and conduits for a coolant bottle of a cooling assembly. Vertical flange 116 includes an engagement feature 146 for securing one or more electrical cables to mounting bracket 92 using, for example, a cable tie fastener. Vertical flange 116 also includes an opening 148 sized and shaped to permit components, illustratively a hose or conduit 111 for electrical wires for light pod 38, of ATV 2 to pass therethrough. Firewall 98 may include an opening at least partially aligned with opening 148 of vertical flange 116 for the pass through of such components.

As shown in FIG. 11, fuse holder or fuse block 90 is mounted to horizontal flange 124 of mounting bracket 92 using at least one fastener 130, illustratively a bolt. Fuser holder 90 includes a cover 140 removably coupled to a body 142. Body 142 of fuse holder 90 may include one or more fuses that provide overcurrent protection of the electrical systems or subsystems of ATV 2. Fuse holder 90 may also include one or more relays for the electrical system or subsystems of ATV 2.

ECU 88 is mounted to an aperture 134 of vertical portion 126 of mounting bracket 92 using at least one fastener 132, illustratively a bolt. ECU 88 is electrically coupled to battery 86 and controls one or more electrical systems or subsystems of ATV 2. ECU 88 may include one or more electrical ports 136, 138 for electrically coupling to one or more electrical systems or subsystems of ATV 2 such as, for example, fuse holder 90. An advantage, among others, of electrical compartment 84 is that battery 86, ECU 88, and fuse holder 90 may be grouped in close proximity to one another and may be accessed simultaneously when, for example, front rack 32 is in the fully opened position. Additionally, because such components are positioned in close proximity to each other, wires and lines extending between such components may be short. In addition, mounting bracket 92 permits at least two components, illustratively ECU 88 and fuse holder 90, to be grouped together in close proximity to each other on the same mounting member.

Figure 13:
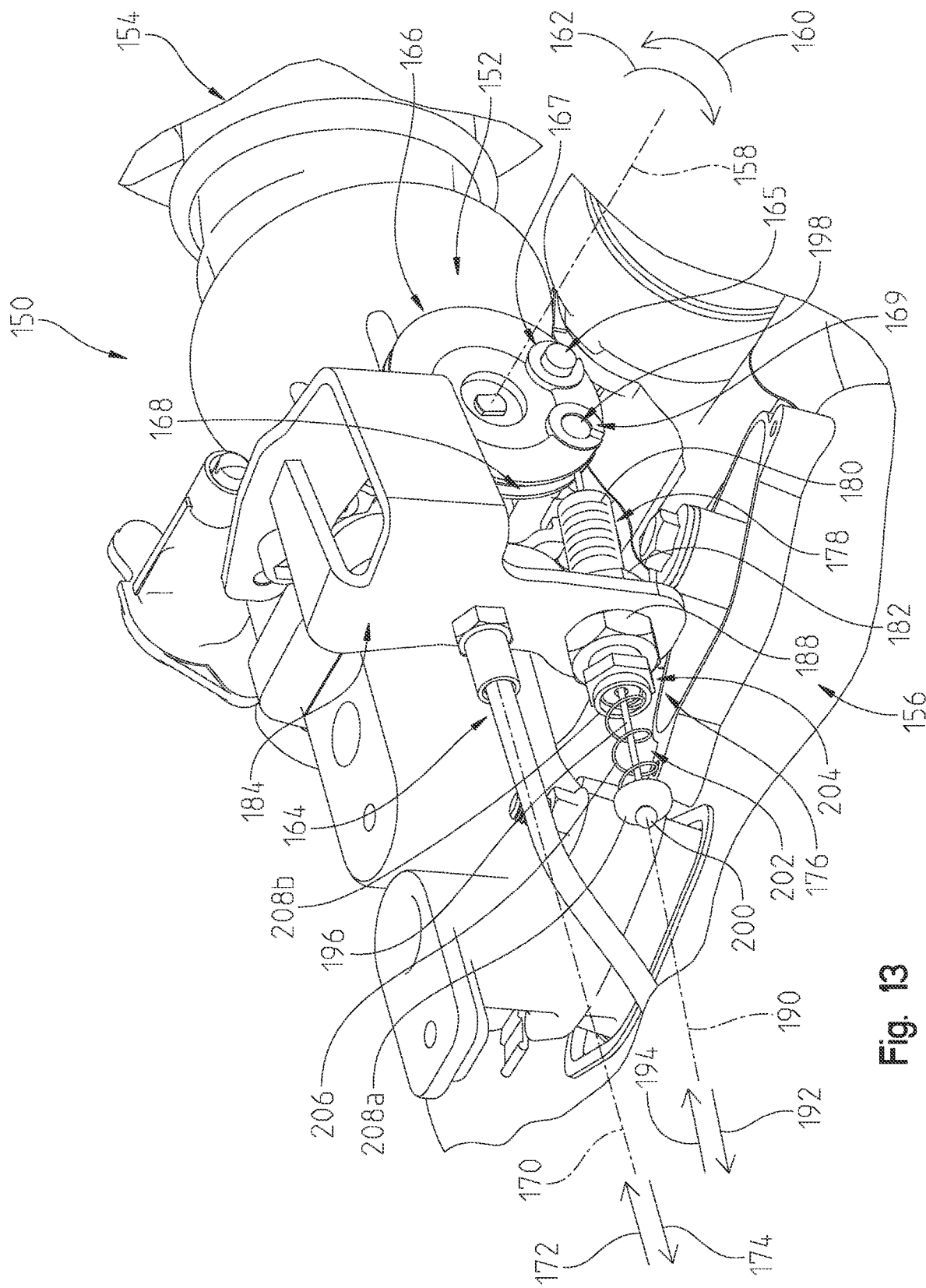
FIG. 13 is a left front perspective view of an illustrative throttle assembly with an adjustable throttle limiter of the present disclosure.
Figure 14A:
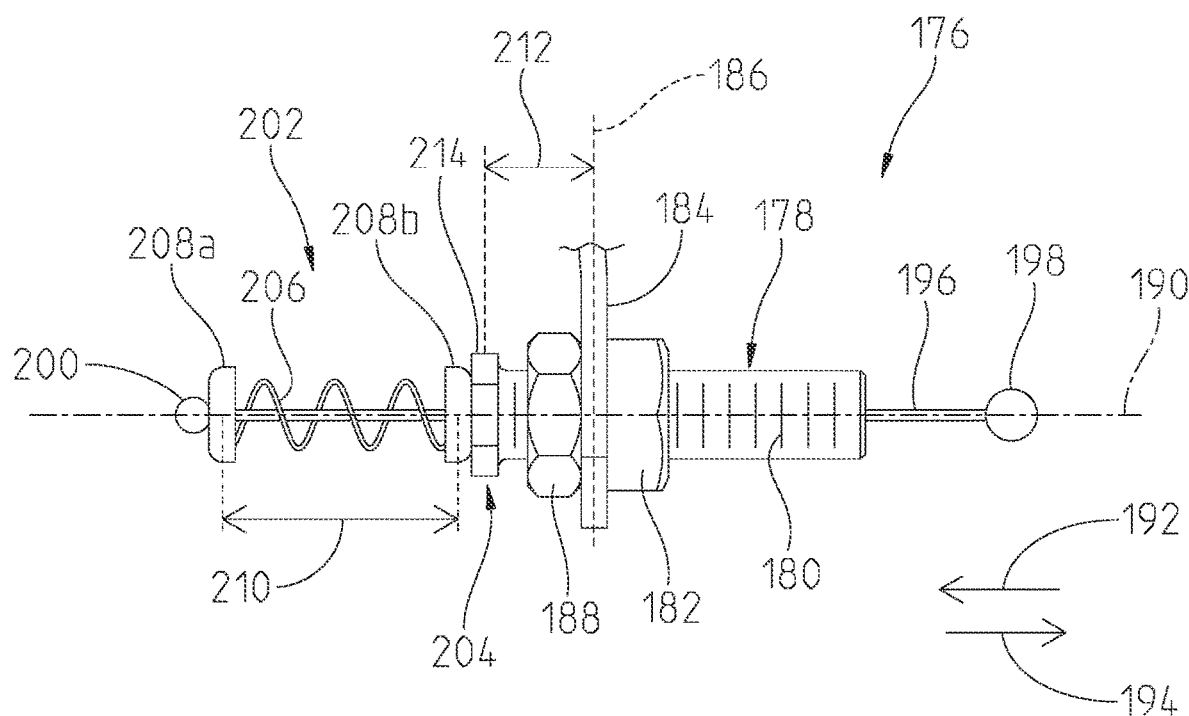
FIG. 14A is a side view of the adjustable throttle limiter of FIG. 13 in a first position corresponding to a full throttle capacity of the throttle assembly of the present disclosure.
Figure 14B:
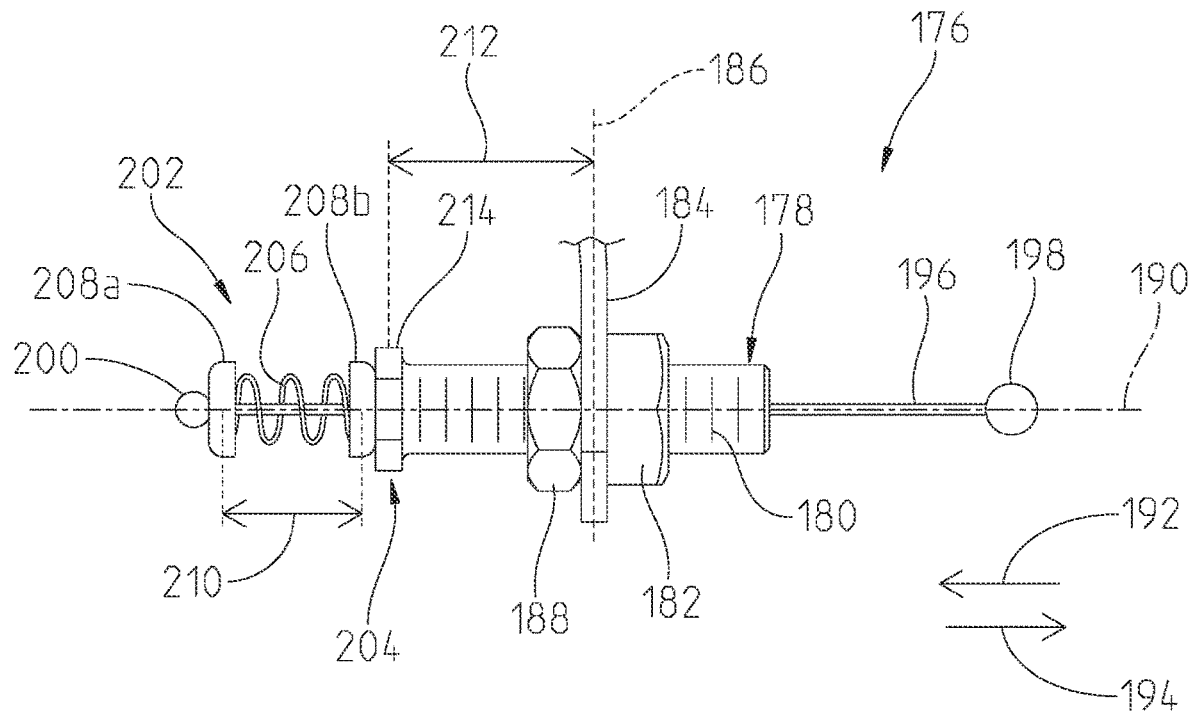
FIG. 14B is a side view of the adjustable throttle limiter of FIG. 13 in a second position corresponding to a partial throttle capacity of the throttle assembly of the present disclosure.
Figure 14C:
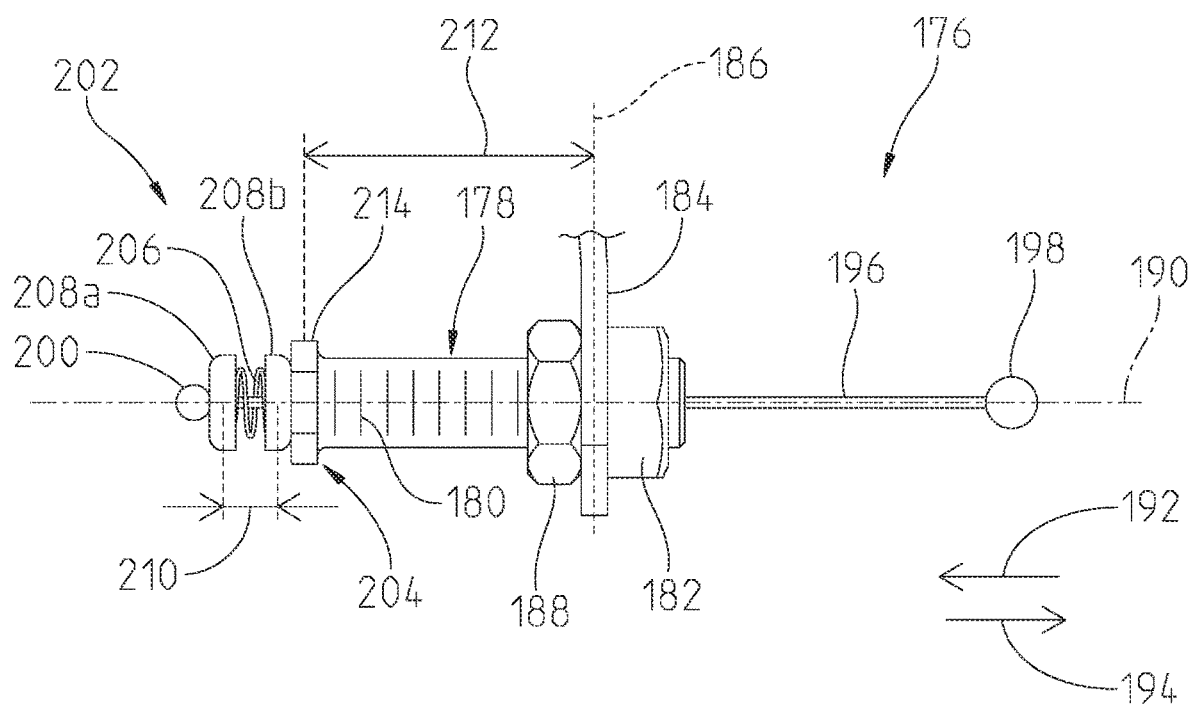
FIG. 14C is a side view of the adjustable throttle limiter of FIG. 13 in a third position corresponding to a minimum throttle capacity of the throttle assembly of the present disclosure.

Turning now to FIGS. 13-14C, a throttle assembly 150 of the present disclosure is illustrated. Throttle assembly 150 includes a throttle body 152 positioned intermediate an intake assembly 154 and an intake portion 156 of a power source, illustratively an engine. Throttle body 152 houses a throttle valve such as, for example, a butterfly valve rotatable about a throttle valve axis 158 to control an amount of intake air which enters intake portion 156 of the engine. More specifically, the throttle valve is rotatable about axis 158 in a direction 160 to increase the amount of air which enters intake portion 156 and is rotatable about axis 158 in a direction 162 to decrease the amount of air which enters intake portion 156. The rotation of the throttle valve about axis 158 may be controlled by a biasing member (not shown) which biases throttle valve in direction 162 and by an input on handlebars 19 (e.g., a throttle lever) via a throttle cable 164.

Throttle cable 164 is received within a circumferential groove 168 of a cam or pulley 166 fixedly coupled to the throttle valve. In this way, throttle cable 164 at least partially encircles pulley 166, which is rotatable about axis 158 in directions 160, 162 with the throttle valve. An end of throttle cable 164 includes a crimp or weldnut 165 that is received within an opening or slot 167 of pulley 166. Throttle cable 164 is axially displaceable along an axis 170 tangent to circumferential groove 168 of pulley 166 in directions 172, 174. More specifically, when throttle cable 164 is displaced in direction 174 as a result of, for example, an operator input to handlebars 19, pulley 166 is rotated about axis 158 in direction 160 to increase the amount of air provided to intake portion 156 of the engine. When the biasing member biases the throttle valve and pulley 166 in direction 162, throttle cable 164 is displaced in direction 172.

Throttle assembly 150 also includes an adjustable throttle limiter 176 coupled to pulley 166 and configured to control or limit an extent of rotation of the throttle valve and pulley 166 about axis 158 in direction 160. More specifically, throttle limiter 176 is adjustable between a first amount of rotation of the throttle valve corresponding to full throttle access and a second amount of rotation of the throttle valve corresponding to no throttle access. In embodiments, the second amount of rotation of the throttle valve may be no rotation of the throttle valve about axis 158.

Throttle limiter 176 comprises a cylindrically shaped housing 178. An exterior surface of housing 178 includes a plurality of engagement features 180, illustratively threads. In the embodiment shown, threads 180 of housing 178 engage with a weldnut 182 of a mounting bracket 184 to align housing 178 with pulley 166 and permit housing 178 to be axially adjusted relative to mounting bracket 184. A fastener 188, illustratively a lock nut, engages threads 180 of housing 178 opposite bracket 184 and weldnut 182. When lock nut 188 is rotated to engage mounting bracket 184, housing 178 is prohibited from axially displacing toward mounting bracket 184. Mounting bracket 184 is coupled to throttle body 152 and provides a reference point or datum 186 (see FIGS. 14A-14C) for adjusting housing 178 along an axis 190 in directions 192, 194 relative to mounting bracket 184 and pulley 166. Throttle limiter 176 also includes a cable 196 that passes through housing 178 and is received within circumferential groove 168 of pulley 166. A first end of cable 196 includes a crimp or weldnut 198 that is received within an opening or slot 169 of pulley 166. As a result, when pulley 166 rotates about axis 158 in direction 160, cable 196 is axially displaced in direction 194. Conversely, when pulley 166 rotates about axis 158 in direction 162, cable 196 is axially displaced in direction 192.

A second end of cable 196 includes a crimp or weldnut 200 secured by a biasing assembly 202. Biasing assembly 202 is positioned intermediate weldnut 200 of cable 196 and an adjustment end 204 of housing 178. Biasing assembly 202 includes a biasing member 206, illustratively a compression spring, positioned intermediate opposing end caps 208, illustratively end caps 208a, 208b. Biasing member 206 applies a biasing force tending to spread ends caps 208a, 208b apart from one another. Because end cap 208b abuts adjustment end 204 of housing 178, biasing member 206 biases end cap 208a in direction 192 away from end cap 208b, indicated by a variable distance 210 in FIGS. 14A-14C. In the embodiment shown, distance 210 generally corresponds to an extent of angular displacement of pulley 166 about axis 158 in direction 160. Thus, the larger distance 210 is, the larger the angular displacement of pulley 166 and the more air that enters intake portion 156 of the engine. Conversely, the smaller distance 210 is, the smaller the angular displacement of pulley 166 and the more air that enters intake portion 156 of the engine. In this way, throttle limiter 176 controls and modulates the throttle body 152 and the performance characteristics of the vehicle.

Because weldnut 198 is secured to pulley 166 and pulley 166 is a fixed distance from mounting bracket 184, a distance 212 of adjustment end 204 of housing 178 relative to mounting bracket 184 (and datum 186) influences an extent of distance 210. In the embodiment shown, distance 212 and distance 210 have an inverse relationship. For example, the smaller distance 212 is, the larger distance 210 is (see FIG. 14A); and the greater distance 212 is, the smaller distance 210 is (see FIG. 14C). Adjustment end 204 of housing 178 includes an engagement feature 214 configured to be grasped by an operator or a tool to rotate housing 178 about axis 190. Rotation of threaded housing 178 about axis 190 results in axial displacement of housing 178 along axis 190 in directions 192, 194 depending upon the direction of rotation of housing 178 about axis 190. When housing 178 is rotated about axis 190 to displace housing 178 along axis 190 in direction 192, distance 212 increases and distance 210 decreases thereby reducing the amount of air which can enter intake portion 156 of the engine. When housing 178 is rotated about axis 190 to displace housing 178 along axis 190 in direction 194, distance 212 decreases and distance 210 increases thereby increasing the amount of air which enter intake portion 156 of the engine. Accordingly, FIG. 14A illustrates a position of throttle limiter 176 corresponding to the maximum amount of air which can enter intake portion 156 of the engine, FIG. 14B illustrates a position of throttle limiter 176 corresponding to a partial amount of air which can enter intake portion 156 of the engine relative to the position of FIG. 14A, and FIG. 14C illustrates a position of throttle limiter 176 corresponding to a minimum amount of air which can enter intake portion 156 of the engine.

In the embodiment shown, both throttle cable 164 and cable 196 of throttle limiter 176 are mounted to mounting bracket 184. It is contemplated, however, that only cable 196 of throttle limiter 176 may be mounted to mounting bracket 184. Throttle limiter 176 may be located internally of the outer body of the vehicle. In one embodiment, throttle limiter 176 is accessible through the front, left wheel well. In addition, a sensor may relay information regarding the position of throttle limiter 176 to an operator or a display screen of light pod 38.

Figure 16:
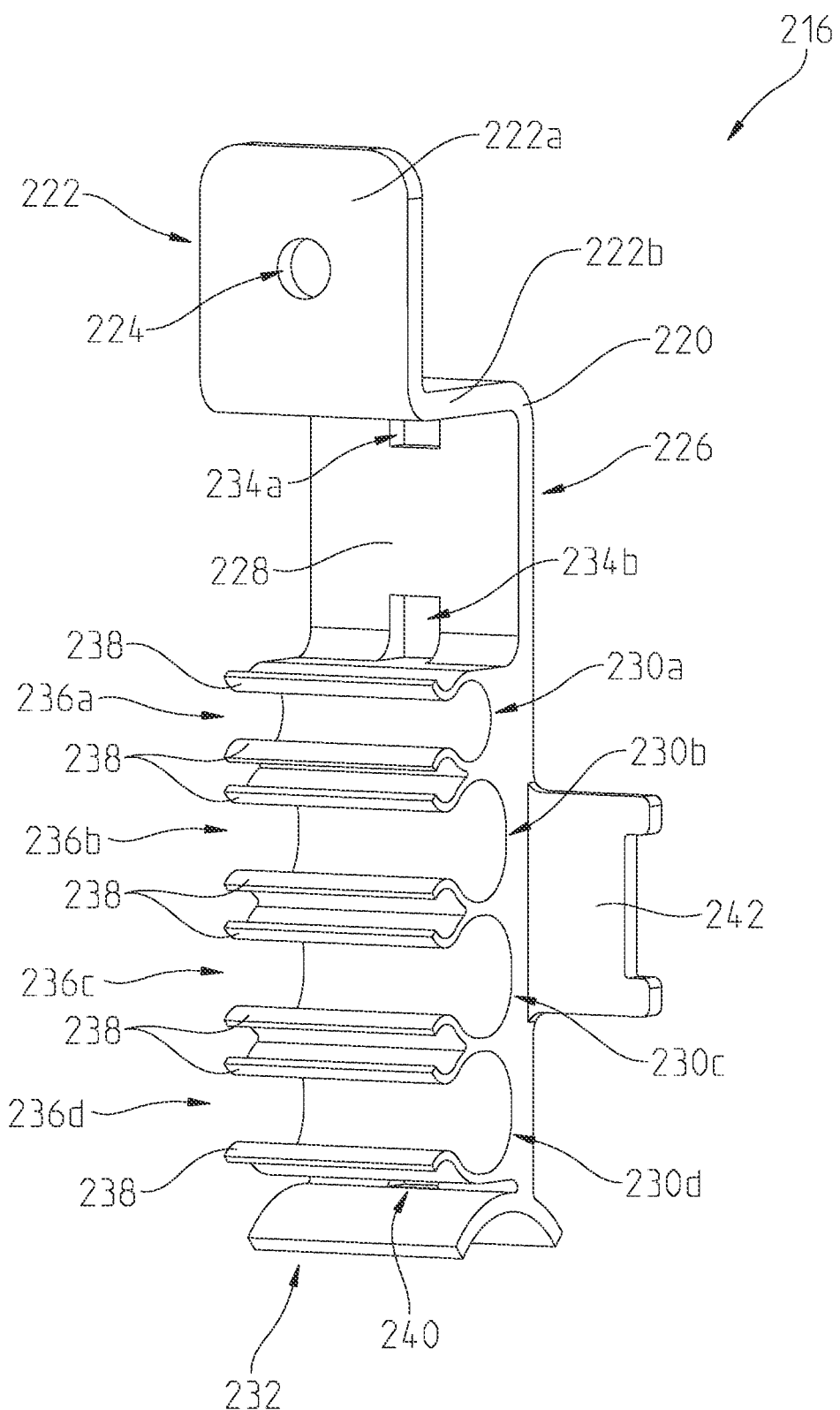
FIG. 16 is a perspective view of the routing clip of FIG. 15.

Turning now to FIGS. 15 and 16, ATV 2 includes a plurality of multi-component routing clips 216 coupled to a frame rail 218 of frame 4. Each of routing clips 216 are configured to secure one or more components of ATV 2 along frame 4. More specifically, routing clip 216 includes an elongated body 220 having a mounting flange 222 for coupling to frame 4. In the embodiment shown, mounting flange 222 has a vertical portion 222a and a horizontal portion 222b. Vertical portion 222a includes an aperture 224 sized to receive a fastener, for example, a push dart style fastener, for coupling routing clip 216 to frame 4. Similarly, horizontal portion 222b may include an aperture sized to receive a fastener, for example, a push dart style fastener, for coupling routing clip 216 to frame 4. In this way, routing clip 216 may be coupled to frame 4 with at least one of vertical portion 222a and horizontal portion 222b of mounting flange 222.

Body 220 includes an elongated portion 226 extending from horizontal portion 222b of mounting flange 222. Elongated portion 226 includes a planar portion 228, a plurality of snaps or clips 230, illustratively clips 230a-d, and a cradle 232 at a distal end of elongated portion 226. Planar portion 228 is positioned intermediate horizontal portion 222b of mounting flange 222 and intermediate clips 230a-d. Planar portion 228 includes at least one slot 234, illustratively slots 234a, 234b, configured to receive a fastener such as, for example, a cable tie. In this way, at least one electrical cable or wiring harness 233 of ATV 2 may be secured to planar portion 228 of routing clip. Clips 230a-d are positioned intermediate planar portion 228 and cradle 232 and are sized and shaped to receive and secure, for example, an electrical cable 235 or an Evaporative Emission Control (hereinafter "EVAP") System hose 237. Each of clips 230a-d is circular in shape and includes a respective springed opening 236a-d. Springed openings 236a-d include flexible protrusions 238, which provide a positive indication for an assembler that a respective component of ATV 2 is aligned with the respective one of springed openings 236a-d. Flexible protrusions 238 also provide a biasing force to retain the component of ATV 2 within the respective one of clips 230a-d. In the embodiment shown, clips 230*a-d* are sized to secure a corresponding component of ATV 2. Accordingly, a diameter of clip 230*a* is smaller than a diameter of clips 230*b-d*. It is contemplated, however, that clips 230*a-d* may be the same size or a different size than shown in FIGS. 15 and 16. It is also contemplated that routing clip 216 may include more or fewer than clips 230*a-d*.

Arcuately shaped cradle 232 (e.g., generally a "C" or "U" shape) is sized and adapted to conform to an outer circumference of a coolant hose 239. Cradle 232 includes at least one slot 240 configured to receive a fastener such as, for example, a cable tie for securing coolant hose 239 (or another component of ATV 2) to cradle 232. In other embodiments, cradle 232 may include springed openings and flexible protrusions similar to clips 230*a-d*. In this way, at least cradle 232 is configured to accommodate conduits, lines, wires, and/or tubes of different diameters because the fastener (e.g., a cable tie) can be lengthened or shortened to secure such members within cradle 232. Elongated body 220 of routing clip 216 also includes a laterally extending side tab 242 positioned laterally adjacent clips 230*a-d*. In the embodiment shown, side tab 242 provides a mounting location for a component of ATV 2 such as, for example, an air breather for the engine. Routing clip 216 may comprise a polymer injected molded part.

Figure 17:
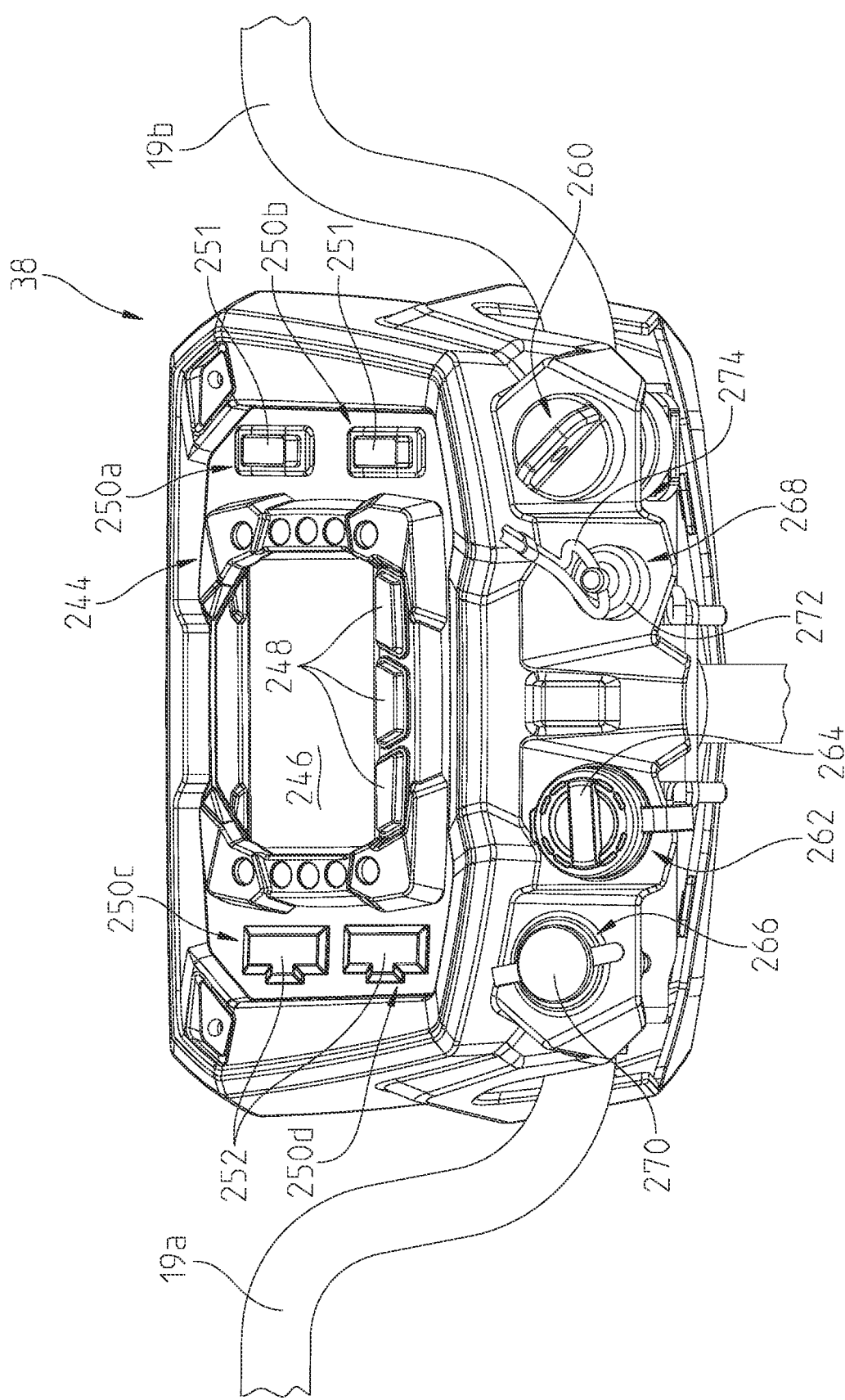
FIG. 17 is a rear view of a light pod of the ATV of FIG. 1.
Figure 18:
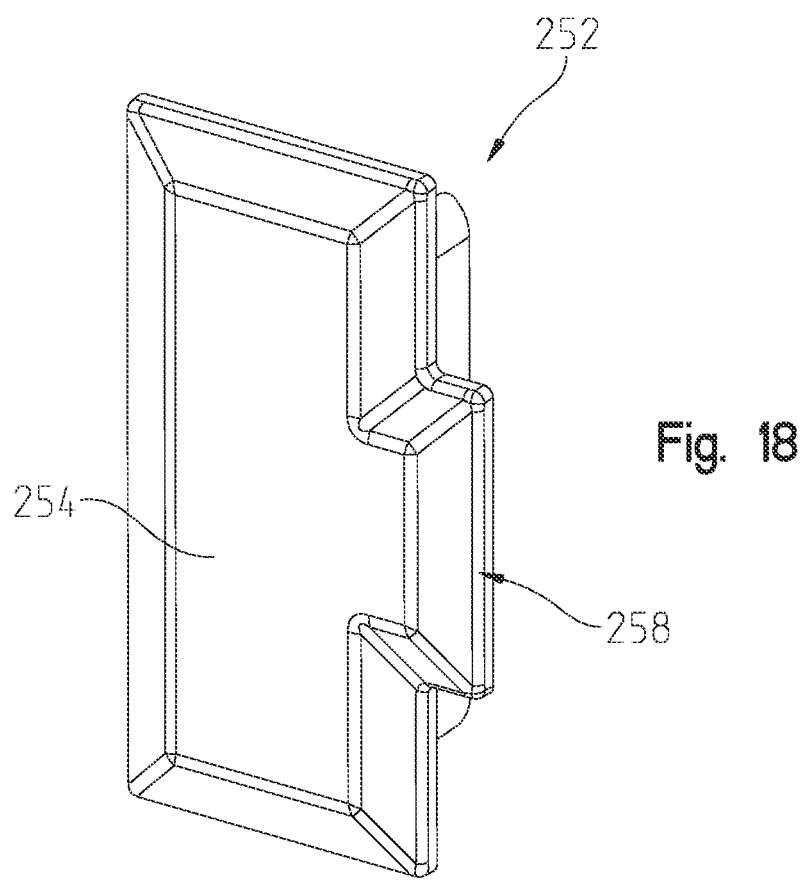
FIG. 18 is a front perspective view of an accessory plug of the light pod of FIG. 17.
Figure 19:
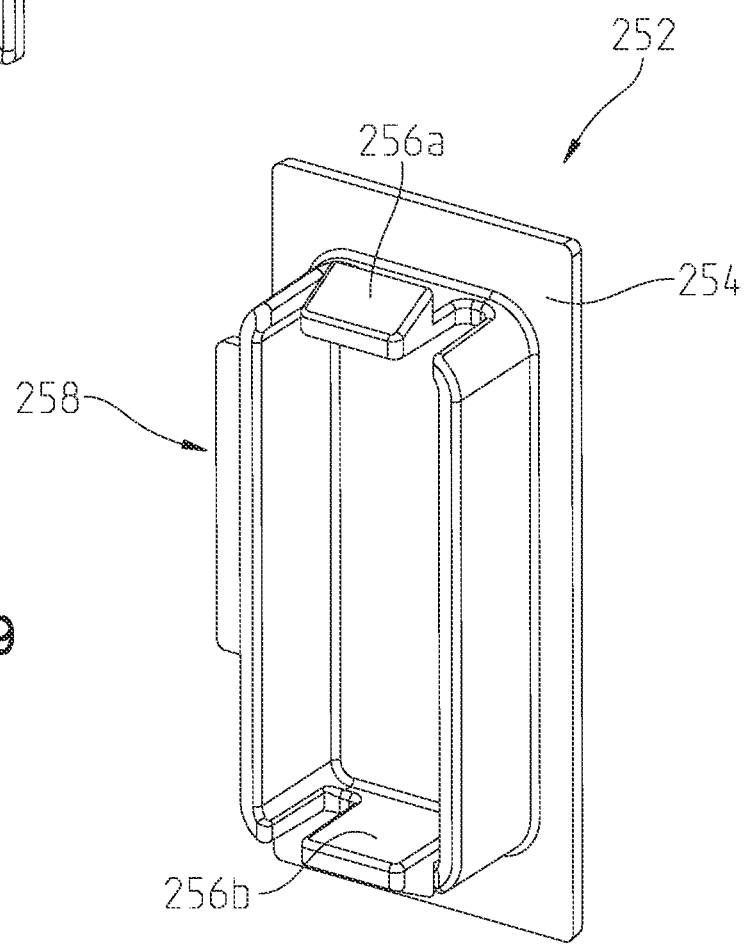
FIG. 19 is a rear perspective view of the accessory plug of FIG. 18.

Turning now to FIGS. 17-19, light pod 38 is shown in more detail. A side of light pod 38 facing seat assembly 16 includes an information display 244 having a display screen 246 configured to display information regarding ATV 2 to an operator. Information display 244 may also include at least one operator input 248, such as a push button, to interact with the information displayed on information display 246. Display screen 246 may be a touch-screen display configured for two-way input such that the operator may input selections through display screen 246 and received information from display screen 246. Alternatively, display screen 246 may merely be a one-way screen configured to display information only.

Positioned adjacent information display 244 is at least one accessory port 250, illustratively accessory ports 250*a-d*. Accessory ports 250*a*, 250*b* include an operator input 251, illustratively a switch, configured to operate an accessory of ATV 2, and accessory ports 250*c*, 250*d* include an accessory plug 252. Accessory plug 252 is inserted into and covers unused accessory ports 250 but may be removed to add a switch when an accessory is added to ATV 2. Accessories include, but are not limited to, a winch and auxiliary lighting. An advantage, among others, of accessory plug 252 is that unused accessory port 250 may be covered until an accessory switch needs to be added to light pod 38. The accessory switch can be added to light pod 38 without modifying light pod 38. As shown in FIGS. 18 and 19, accessory plug 252 comprises a generally planar cover 254. Extending rearward from planar cover 254 are at least one retaining member 256, illustratively retaining members 256*a*, 256*b*, for retaining accessory plug 252 in accessory port 250. Accessory plug 252 also includes a tab 258 extending laterally outward from planar cover 254. Tab 258 facilitates removal of accessory plug 252 from accessory port 250.

Referring specifically to FIG. 17, light pod 38 also includes an ignition switch 260 and a battery tender port 262. Battery tender port 262 is electrically coupled to battery 86 and permits an operator to charge battery 86 when ATV 2 is not in use. That is, battery tender port 262 is configured to receive a complementary electrical connector from a battery tender and transfer power from the battery tender to battery 86. In the embodiment shown, battery tender port 262 is positioned vertically below display screen 246 and horizontally aligned with ignition switch 260. An advantage, among others, of battery tender port 262 positioned on light pod 38 is that battery tender port 262 is in an easily accessible location for charging battery 86. Another advantage, among others, of battery tender port 262 positioned on light pod 38 is that battery tender port 262 is readily visible to an operator and provides a visual reminder to charge battery 86. Battery tender port 262 may include a cover 264 configured to protect battery tender port 262 when not in use such as, for example, during operation of ATV 2.

Light pod 38 further includes a 12v accessory socket or port 266 and an off switch 268. Accessory port 266 is configured to receive a complementary adapter or plug and provide electrical power from the electrical system of ATV 2 to a portable accessory. Accessory port 266 may include a cover 270 configured to protect battery tender port 262 when not in use. Off switch 268 is controllably coupled to, for example, powertrain 10 or battery 86 and includes a base 272 and a leash or tether 274 releasably coupled thereto. When tether 274 is detached from base 272 during operation of ATV 2, powertrain 10 may be shut off to prohibit ATV 2 from further operation until tether 274 is reattached to base 272. In some embodiments, ATV 2 may not be operable until and unless tether 274 is attached to base 272.

While this invention has been described as having an illustrative design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. An all-terrain vehicle, comprising:
   a powertrain having an air intake portion;
   a throttle body assembly in fluid communication with the air intake portion of the powertrain, the throttle body assembly including a throttle body and a cam rotatably coupled to the throttle body; and
   an adjustable throttle limiter operably coupled to the cam, the adjustable throttle limiter being moveable between a first position corresponding to a first angular displacement of the cam and a second position corresponding to a second angular displacement of the cam, and the first angular displacement greater than the second angular displacement of the cam, wherein movement of the adjustable throttle limiter changes a volume of air that enters the air intake portion.

2. The all-terrain vehicle of claim 1, wherein the throttle body assembly defines a datum and the adjustable throttle limiter is axially moveable relative to the datum.

3. The all-terrain vehicle of claim 1, wherein the throttle body assembly includes a mounting bracket supported by the throttle body, and the adjustable throttle limiter includes a threaded stud engaged with the mounting bracket, and the threaded stud is axially and rotatably moveable relative to the mounting bracket.

4. The all-terrain vehicle of claim 1, wherein the adjustable throttle limiter includes a cable, and a first end of the cable is coupled to the cam and a second end is coupled to a biasing assembly.

5. The all-terrain vehicle of claim 4, wherein the biasing assembly includes a biasing member disposed between a first end cap and a second end cap, and the biasing member applies a biasing force configured to move the first end cap away from the second end cap.

6. The all-terrain vehicle of claim 5, wherein a distance between the first end cap and the second end cap corresponds to an amount of angular displacement of the cam.

7. The all-terrain vehicle of claim 6, wherein the adjustable throttle limiter is adjustable to change the distance between the first end cap and the second end cap to control and modulate an amount of air entering the air intake portion of the powertrain.

8. The all-terrain vehicle of claim 1, wherein the first position allows a greater volume of air to enter the air intake portion than in the second position.

9. The all-terrain vehicle of claim 1, further including a valve operatively coupled to the adjustable throttle limiter, the valve configured to rotate about an axis in response to movement of the adjustable throttle limiter between the first and second positions.

10. The all-terrain vehicle of claim 9, further comprising a throttle lever moveable between a first and second position, and wherein movement of the throttle lever is configured to rotate the valve.

11. The all-terrain vehicle of claim 10, further comprising a steering assembly including at least one handlebar, wherein the throttle level is positioned on the at least one handlebar.

12. An all-terrain vehicle, comprising:
a powertrain having an air intake portion;
a throttle body assembly in fluid communication with the air intake portion of the powertrain, the throttle body assembly including a throttle body and a cam rotatably coupled to the throttle body;
a throttle valve coupled to the throttle body and rotatable about an axis to control a volume of air entering the air intake portion; and
an adjustable throttle limiter operably coupled to the cam and configured to limit an extent of the rotation of the throttle valve about the axis, the adjustable throttle limiter including a housing.

13. The all-terrain vehicle of claim 12, wherein the adjustable throttle limiter is adjustable between a first position and a second position, wherein the first position corresponds to a first amount of rotation of the throttle valve and the second position corresponds to a second amount of rotation of the throttle valve, and wherein the first and second positions are different.

14. The all-terrain vehicle of claim 13, wherein the first amount of rotation of the throttle valve corresponds to an open position for full throttle access.

15. The all-terrain vehicle of claim 13, wherein the second amount of rotation of the throttle valve corresponds to a closed position for substantially no throttle access.

16. The all-terrain vehicle of claim 12, further including a mounting bracket supported by the throttle body, wherein the housing is configured to be axially adjusted in position relative to the mounting bracket.

17. The all-terrain vehicle of claim 12, wherein the adjustable throttle limiter includes a cable, and a first end of the cable is coupled to the cam and a second end is coupled to a biasing assembly, wherein the biasing assembly includes a biasing member disposed between the first end and second end of the cable.

18. The all-terrain vehicle of claim 17, wherein the biasing member applies a biasing force configured to move the first end away from the second end, and wherein a distance between the first end and the second end of the cable corresponds to an amount of distance between an end of the housing and the mounting bracket to modulate the volume of air entering the air intake portion.

19. The all-terrain vehicle of claim 17, further comprising a steering assembly including at least one handlebar, wherein the biasing member may be controlled by a throttle level positioned on the at least one handlebar.

20. An all-terrain vehicle, comprising:
a powertrain having an air intake portion;
a throttle body assembly in fluid communication with the air intake portion of the powertrain, the throttle body assembly including a throttle body, a cam rotatably coupled to the throttle body, and a mounting bracket supported by the throttle body; and
an adjustable throttle limiter operably coupled to the cam, the adjustable throttle limiter being moveable between a first position corresponding to a first angular displacement of the cam and a second position corresponding to a second angular displacement of the cam, and the first angular displacement greater than the second angular displacement of the cam,
wherein adjustable throttle limiter includes a threaded stud engaged with the mounting bracket, and the threaded stud is axially and rotatably moveable relative to the mounting bracket.

\* \* \* \* \*